United States Patent
Kikuchi

(10) Patent No.: US 6,606,715 B1
(45) Date of Patent: Aug. 12, 2003

(54) DEVICE CONTROL APPARATUS AND CONTROL METHOD

(75) Inventor: Nobuyuki Kikuchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/488,012

(22) Filed: Jan. 20, 2000

(30) Foreign Application Priority Data

Jul. 23, 1999 (JP) ............................................. 11-208914

(51) Int. Cl.[7] ................................................. H02H 3/05
(52) U.S. Cl. .............................. 714/15; 714/16; 714/18; 711/113; 711/114
(58) Field of Search ............................. 714/16–18, 6, 714/15; 711/113, 114

(56) References Cited

U.S. PATENT DOCUMENTS

| | | | | |
|---|---|---|---|---|
| 5,564,116 A | * | 10/1996 | Arai et al. .................... | 711/114 |
| 5,954,822 A | * | 9/1999 | Yashiro et al. ................. | 714/6 |
| 6,032,263 A | * | 2/2000 | Yamamoto et al. ............. | 714/6 |
| 6,067,635 A | * | 5/2000 | DeKoning et al. ........... | 711/114 |
| 6,148,414 A | * | 11/2000 | Brown et al. ................. | 714/11 |
| 6,173,361 B1 | * | 1/2001 | Taketa .......................... | 711/113 |
| 6,401,170 B1 | * | 6/2002 | Griffith et al. ............... | 711/114 |
| 6,408,400 B2 | * | 6/2002 | Taketa et al. .................. | 714/49 |

FOREIGN PATENT DOCUMENTS

| | | |
|---|---|---|
| JP | 5-324206 A | 12/1993 |
| JP | 6-119120 | 4/1994 |
| JP | 6-119126 A | 4/1994 |
| WO | 93/15550 | 8/1993 |

* cited by examiner

*Primary Examiner*—Robert Beausoliel
*Assistant Examiner*—Yolanda L. Wilson
(74) *Attorney, Agent, or Firm*—Staas & Halsey LLP

(57) ABSTRACT

A protection data control unit is provided for a cache control unit. In the writing operation to write user data from an upper apparatus into a cache memory, protection data is formed on a data block unit basis of the user data and written into the cache memory. When the interruption of the transfer of the data block is detected during the writing into the cache memory, a forming state of the protection data upon interruption is stored in the cache memory. When the transfer restart of the data block is detected after the interruption, the forming state is returned to the forming state of the protection data upon interruption stored in the cache memory and the formation of the protection data is restarted.

19 Claims, 16 Drawing Sheets

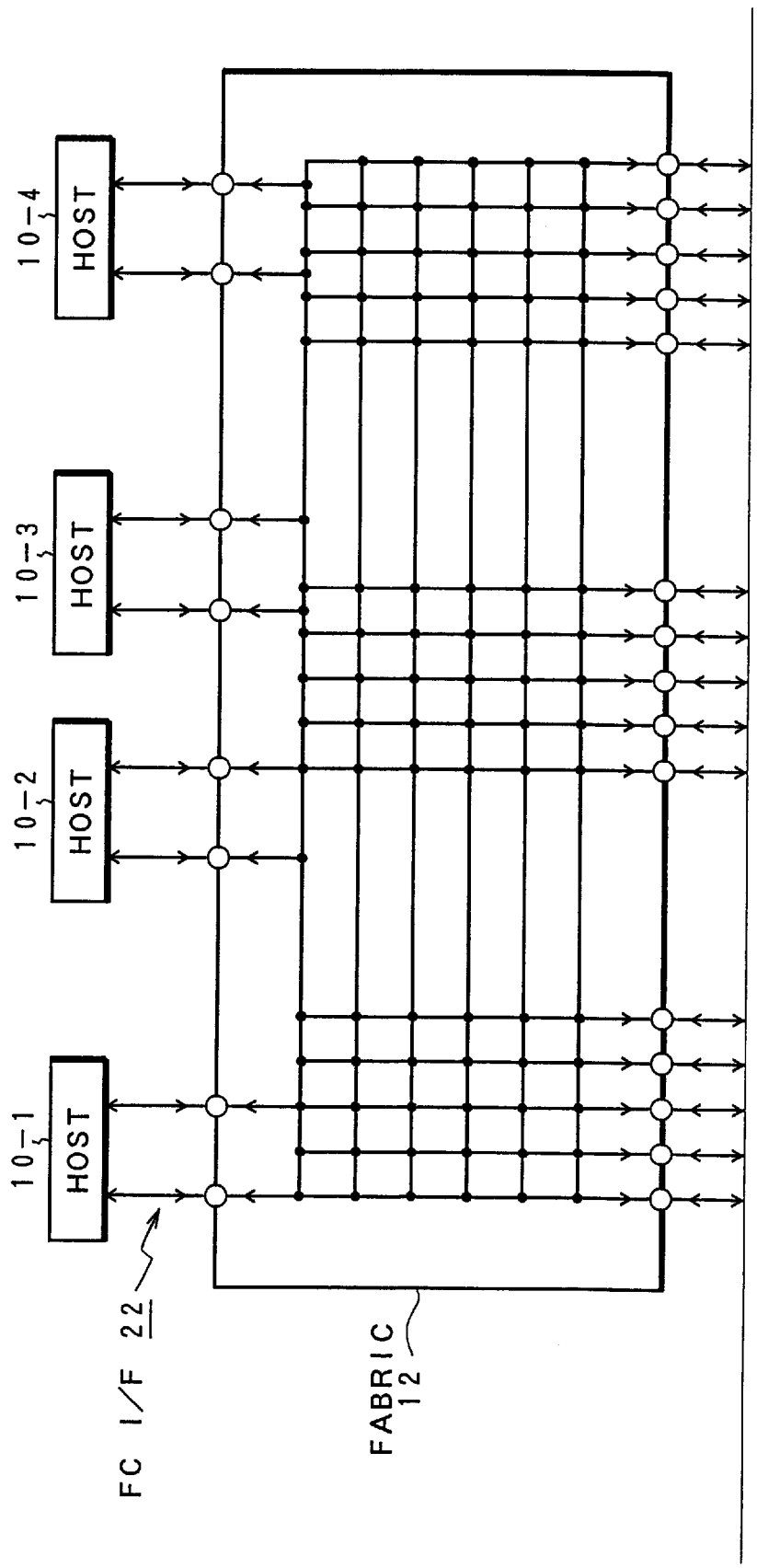

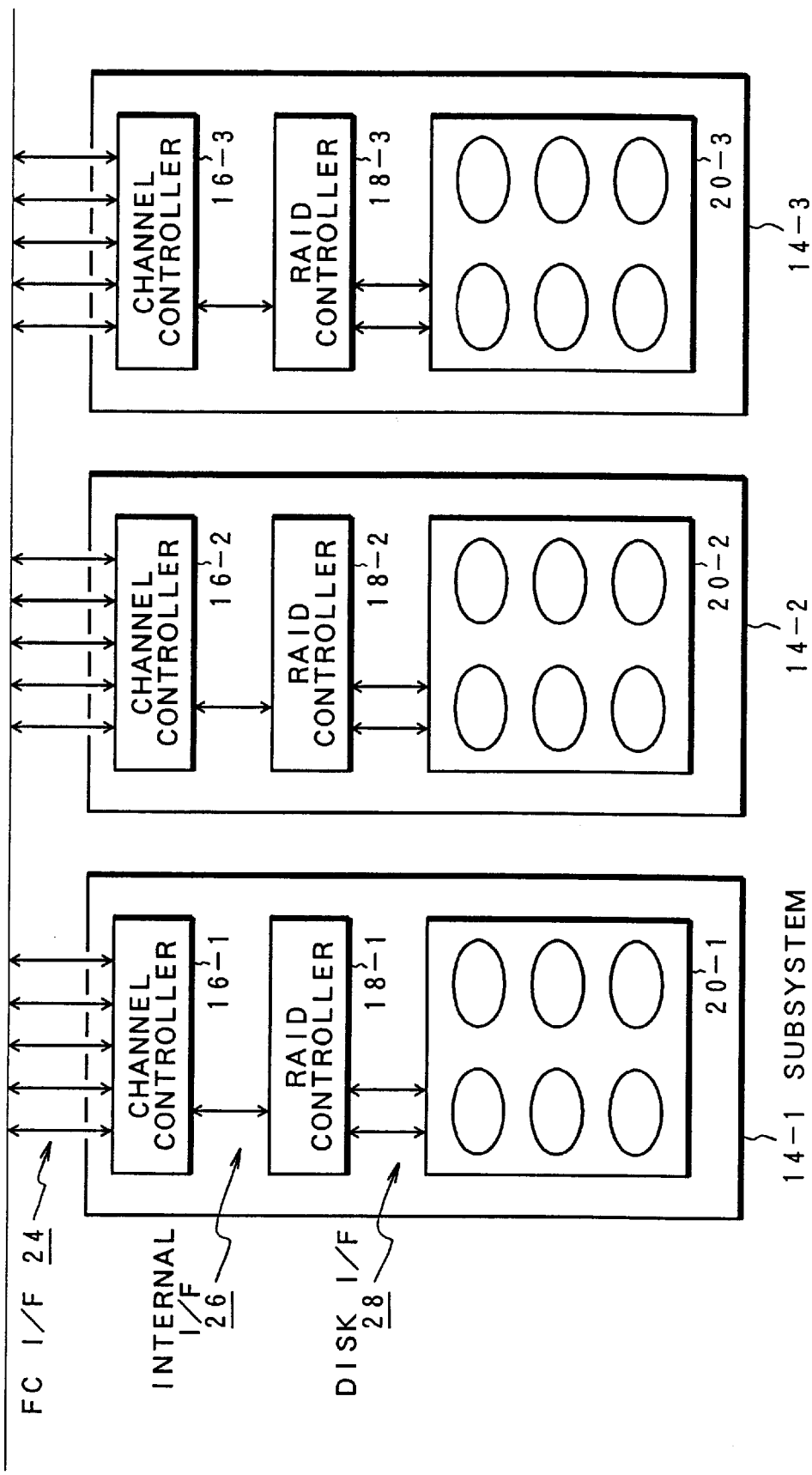

DEVICE CONTROL APPARATUS AND CONTROL METHOD

BACKGROUND OF THE INVENTION

1. Field of the Invention

The invention relates to a device control apparatus and a control method for realizing a high speed input/output access between an upper apparatus and device units such as array disk units or the like constructed by a plurality of magnetic disk units. More particularly, the invention relates to a device control apparatus and a control method for forming protection data such as a CRC or the like and adding it when user data from an upper apparatus such as a host or the like is buffered into a cache memory.

2. Description of the Related Arts

In recent years, a system for efficiently accessing array disk units by using a construction such that the array disk units constructed by a plurality of magnetic disk units are shared by a plurality of hosts through an array disk control apparatus has been realized. In such a system construction, a system in which a path change-over switch using a fiber channel interface (FC I/F), what is called a fabric is inserted between the host and the array disk control apparatus and an access is efficiently executed is realized. In the array disk control apparatus, protection data such as a CRC (Cyclic Redundancy Check code) or the like is formed on a unit basis of a block of user data which is transferred from the host, thereby protecting the user data. The protection data is formed in parallel when it is transferred to a buffer in the array disk control apparatus, the protection data is added to the end of each block data, and the resultant data is stored into the buffer.

However, under the system construction such that the fabric for path switching using the fiber channel interface is inserted between the host and the array disk control apparatus, there is a case where while the data block is being transferred from the upper apparatus to the array disk control apparatus, the transfer is interrupted due to a change-over of the switch of the fabric. To prevent such a situation, the transfer of the data block and the formation of the protection data are not simultaneously performed in the array disk control apparatus, but after the transfer of the data block from the host was finished and the data block was stored into the buffer, the protection data is formed while the block data is being read out from the buffer, the formed protection data is added to the data block, and the resultant data is again stored into the buffer. There are, consequently, problems such that it takes time to form the protection data at the time of storing user data into the buffer, a buffer area which is used in this instance also increases, and the accessing performance in case of writing the user data cannot be sufficiently raised.

SUMMARY OF THE INVENTION

According to the invention, there are provided a device control apparatus and a control method in which even if an interruption occurs in a transfer of a data block, the transfer of the data block and a formation of protection data can be simultaneously performed, thereby raising accessing performance.

According to the invention, there is provided a device control apparatus comprising: a host interface control unit for controlling a communication with an upper apparatus such as a host; a device interface control unit for controlling a communication with a device; a cache memory in which user data and a management table have been stored; a cache control unit for controlling the cache memory; and a main control unit for controlling each control unit by executing a control program stored in a main memory. According to the device control apparatus of the invention, a protection data control unit is provided for the cache control unit, the protection data is formed on a data block unit basis of the user data and written into the cache memory at the time of the writing operation for writing the user data from the upper apparatus into the cache memory. When the interruption of the transfer of the data block is detected, a forming state of the protection data at the time of interruption is stored into the cache memory. When a restart of the transfer of the data block is detected, the forming state is returned to the forming state of the protection data upon interruption stored in the cache memory and the formation of the protection data is restarted. The device control apparatus of the invention as mentioned above detects the interruption of the transfer of the data block and stores the forming state of the protection data at that time. When the restart of the transfer of the data block is detected, the state of the control unit which forms the protection data is returned to the state upon interruption of the data transfer. Thus, the transfer of the user data to the cache memory and the formation of the protection data can be executed in parallel and an interface speed between the cache control unit and the cache memory can be suppressed. Further, since there is no need to again read out the data from the buffer memory in order to form the protection data, a delay of a status report to the upper apparatus side can be avoided and the access performance can be improved.

The protection data control unit compares an OP code at the start of the transfer which is set by the control program of the main control unit with an OP code during the transfer, detects the interruption of the transfer when a difference between them is confirmed, and after the transfer interruption, compares the OP code at the time of interruption with the OP code during the interruption and detects the restart of the transfer when a difference between them is confirmed. The protection data control unit writes the data block and the formed protection data into the cache memory and stores therein when the transfer in a boundary portion of the data block is interrupted, reads out a protection data formation initial value from the cache memory, and forms protection data of the next data block when the transfer is restarted. The protection data control unit writes the protection data during the formation into the cache memory and stores therein when the transfer is interrupted in the halfway of the data block, reads out the protection data during the formation from the cache memory when the transfer is restarted, and restarts the formation of protection data corresponding to the remaining data blocks after the forming state was returned to the state upon interruption.

To manage the protection data in a protection data area and the block data in a buffer area, the cache memory of the device control apparatus of the invention has a protection data management table constructed by:

- a start block address showing a start position of transfer data;
- a transfer block count showing the number of blocks to be transferred;
- a protection data head storage destination address to store the formed protection data;
- an OP code which is set in accordance with a data transfer state such as transfer, interruption, restart, or the like; and a seed which gives the protection data formation initial value.

In this case, at the start of the transfer, the protection data control unit sets the protection data head storage destination address in the table to address data of a cache access destination, sets the seed in the table into a seed register, and further sets the transfer block count in the table into a transfer count. Processes for increasing the address data and the transfer count after the data block and the protection data were stored into the cache memory and setting the seed in the table into the seed register are repeated each time the transfer of the data block is finished.

To manage the protection data during the formation, the cache memory has an intermediate protection data management table constructed by:

- a block address showing a start position of the transfer data;
- an intermediate protection data storage destination address of the cache to temporarily store intermediate protection data during the formation;
- an OP code which is set in accordance with a data transfer state such as transfer, interruption, restart, or the like;
- a next seed for copying a seed which is being used;
- a transferred count showing the number of remaining bytes of the data block; and
- an executed block count showing the number of remaining blocks to be transferred.

In this case, when the transfer is interrupted at a block boundary of the block data, the protection data control unit copies address data to access a cache protection data area to an intermediate protection data storing address in the table, copies the OP code set by a control program of the main control unit to an OP code in the table, copies a seed register to a next seed in the table, copies a transfer count to the transferred count in the table, and further copies a block count register to the executed block count. When the interrupted transfer is restarted, the protection data control unit sets the intermediate protection data storing address in the table to address data to access the cache protection data area, sets a next seed in the table into the seed register, sets the transferred block count in the table to the transfer count, and further sets the executed block count in the table to the block count register. Further, when the transfer is interrupted in the halfway of the data block, the protection data control unit copies the address data to access the cache protection data area into the intermediate protection data storing address in the table without increasing, and writes the intermediate protection data during the formation into the protection data area in the cache memory. When the interrupted transfer is restarted, the protection data control unit reads out the intermediate protection data from the cache protection data area, sets it into the intermediate seed register, and thereafter, restarts the formation of the intermediate protection data.

The device control apparatus of the invention constructs the inside of the cache memory by dividing it into: a cache management table area to store management information of data stored in the cache; a buffer area to temporarily store user data transferred from the upper apparatus via an internal bus; a protection data area to store the protection data of the user data stored in the buffer area; and a cache area to store the data transferred from the device via the internal bus. The protection data control unit forms the protection data from the data block by using the seed value, as an initial value, in the seed register which is set by the control program of the main control unit. The protection data control unit has a selector for switching the storage destination address of the user data and the storage destination address of the formed protection data when the user data is stored into the buffer area in the cache memory. While the protection data is formed from the data block read out from the cache memory at the time of the reading operation to read out and transfer the data block from the cache memory to the upper apparatus, the protection data control unit simultaneously compares the formed protection data with the protection data read out from the cache memory and transfers the formed protection data to the upper apparatus when it is legal. While the protection data is formed from the data block of the read-out user data when the data read out from the device by the device interface control unit is written into the cache area in the cache memory, the protection data control unit compares the formed protection data with the protection data added to the read-out data block and finishes the processes as being normal when it is legal. The device which is used in the device control apparatus of the invention is an array disk unit constructed by a plurality of magnetic disk units. Further, the device control apparatus of the invention relates to a system, as a target, in which a fabric which functions as a switch for path change-over using the fiber channel interface is provided between the device control apparatus and the upper apparatus.

According to the invention, there is provided a device control method of controlling input/output between an upper apparatus and a device apparatus through a cache memory, comprising the steps of:

at the time of a writing operation to write user data from the upper apparatus into the cache memory, forming protection data on a data block unit basis of the user data and writing it into the cache memory;

when an interruption of a transfer of the data block is detected, storing a forming state of the protection data at the time of interruption into the cache memory; and when a restart of the transfer of the data block is detected, returning the forming state to the forming state of the protection data at the time of interruption stored in the cache memory and restarting the formation of the protection data. The details of the device control method is substantially the same as that in case of the construction of the device control apparatus.

The above and other objects, features, and advantages of the present invention will become more apparent from the following detailed description with reference to the drawings.

BRIEF DESCRIPTION OF THE DRAWINGS

FIGS. 1A and 1B are block diagrams of an input/output system to which a device control apparatus of the invention is applied;

DETAILED DESCRIPTION OF THE PREFERRED EMBODIMENT

Construction and Function of the Apparatus

Figure 2:
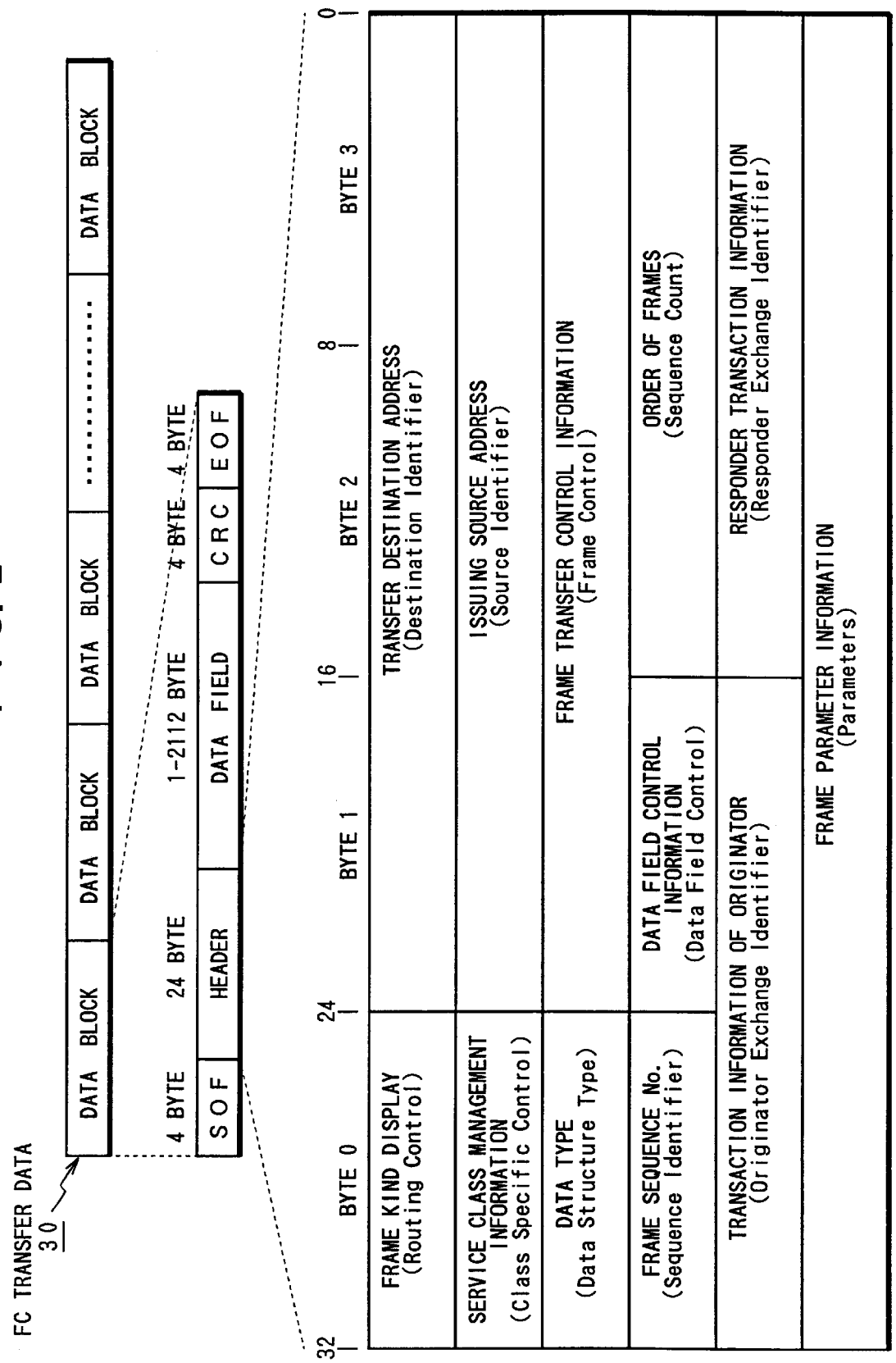
FIG. 2 is an explanatory diagram of a format of a transfer frame in fabrics in FIGS. 1A and 1B.

FIGS. 1A and 1B are block diagrams of a computer system to which a device control apparatus and its control method of the invention are applied. A plurality of hosts 10-1 to 10-4 are connected to subsystems 14-1 to 14-3 through a fabric 12 which functions as a switch for path change-over. The subsystems 14-1 to 14-3 have: channel controllers 16-1 to 16-3; RAID controllers (array disk control apparatuses) 18-1 to 18-3 corresponding to the device control apparatus of the invention; and array disk units 20-1 to 20-3 serving as device units, respectively. Fiber channel interfaces (FC I/F) are used between the hosts 10-1 to 10-4 and the fabric 12 and between the fabric 12 and the subsystems 14-1 to 14-3, respectively. Internal interfaces 26 are used between the channel controllers 16-1 to 16-3 of the subsystems 14-1 to 14-3 and the RAID controllers 18-1 to 18-3. Further, disk interfaces 28 are used between the RAID controllers 18-1 to 18-3 and the array disk units 20-1 to 20-3, respectively. Fiber channel interfaces 22 and 24 used in the fabrics 12 provided between the hosts 10-1 to 10-4 and the subsystems 14-1 to 14-3 will now be described. An apparatus having such fiber channel interfaces 22 and 24 is called a node. As a connecting mode between the nodes, there is a fabric connecting mode (fabric topology) using the fabric 12 as shown in FIGS. 1A and 1B. According to the fabric topology, the nodes, in this case, the hosts 10-1 to 10-4 and the subsystems 14-1 to 14-3 are connected via the fabric 12 called a switch or router, and it is not particularly conscious of a point that along which path the connection between the two nodes in the fabric 12 is performed. The fiber channel interfaces 22 and 24 have the following four service classes.

Class 1:

Class in which a dedicated connection is established and the apparatus operates.

Class 2:

Class in which the apparatus operates without using a special connecting path, data can be promptly sent to different partner destinations, and a confirmation of reception is required from the receiving side.

Class 3:

Class in which the apparatus operates without using a special connecting path, and a confirmation of reception is not required from the receiving side.

Class 4:

Class in which the apparatus operates in a virtual connecting mode, and it enables a distribution using band widths between the ports of the transfer destination.

Therefore, in the fiber channel interfaces 22 and 24 using the fabric topology in FIGS. 1A and 1B, Class 2 is a prerequisite condition as a service Class. The fiber channel interface 22 using such a fabric topology is defined by the following standards.

I. FC-PH: Fiber Channel Physical Interface Physical interface regarding the fiber channel Standards: ANSI#X3.230—1994 (Rev. 4.3)

II. FC-FG: Fiber Channel Fabric Generic Requirement General requirements regarding the fiber channel ● fabric Standards: ANSI#X3.289—1996 (Rev. 3.5)

As a fabric 12 in FIGS. 1A and 1B, the fabric of the product No. ES-2500 or ED-5000 manufactured by McDATA Co., Ltd. can be used. As an FC protocol chip corresponding to the fabric 12, the protocol chip of the product No. QLA-2200 or QLA-2200F manufactured by QLogic Co., Ltd. can be used.

FIG. 2 is an explanatory diagram of a format of fiber channel transfer data of the fiber channel interfaces 22 and 24 via the fabric 12 in FIGS. 1A and 1B. First, in the fiber chancel interface, as shown in FC transfer data 30, a unit called a frame becomes the minimum unit of the transfer data and a packet is constructed by one or more frames. As for each frame, as shown on the lower side in the diagram, the head frame is constructed by: a start frame boundary SOF of 4 bytes; a header of 24 bytes; a data field having a value within a range of 0 to 2112 bytes; a CRC (Cyclic Redundancy Check code) of 4 bytes; and a frame end boundary of 4 bytes. Among them, as shown on the lower side in the diagram, the header of 24 bytes is constructed by: a frame kind display (Routing Control); a transfer destination address (Destination Identifier); a service class management information (Class Specific Control); an issuing source address (Source Identifier); a data type (Data Structure Type); a frame transfer control information (Frame Control); a frame sequence number (Sequence Identifier); data field control information (Data Field Control); an order of frames (Sequence Count); a transaction information of an originator (originator Exchange Identifier); responder transaction information (Responder Exchange Identifier); and frame parameter information (Parameters).

Referring again to FIGS. 1A and 1B, the RAID controllers 18-1 to 18-3 provided in the subsystems 14-1 to 14-3 form protection data such as a cyclic redundancy check code (CRC) or the like on a block unit basis for the user data which is transferred from the hosts 10-1 to 10-4, thereby protecting the user data. The protection data is formed in parallel when the data blocks of the user data are transferred into buffer areas of the cache memories in the RAID controllers 18-1 to 18-3. The protection data is added to the end of each data block and the resultant data block is stored into the buffer area. However, in case of transferring the user data by the path switching by the fabric 12 using the fiber channel interfaces 22 and 24, there is a case where the transfer is interrupted in association with the path switching of the fabric 12. In this state, the transfer of the data block and the formation of the protection data cannot be simultaneously performed. On the other hand, in the RAID controllers 18-1 to 18-3 of the invention, a fact that the transfer of the data block was interrupted is detected during the transfer of the user data from the host and a state of the forming circuit of the protection data at that time is stored. After that, when the restart of the transfer of the data block is detected, the state is returned to the stored circuit state upon interruption and the formation of the protection data is restarted.

Figure 3A:
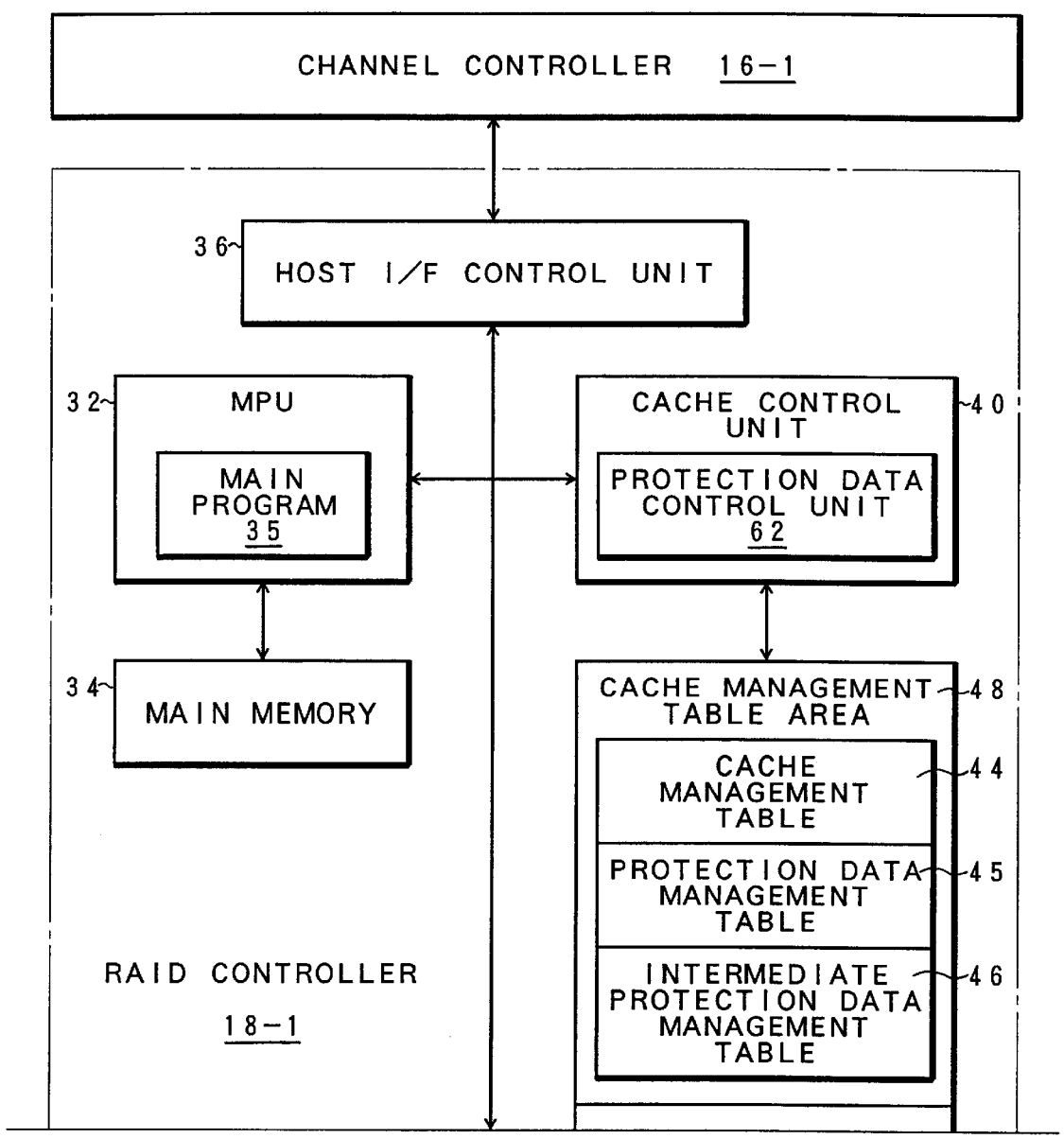
FIGS. 3A and 3B are block diagrams of an array disk control apparatus in FIGS. 1A and 1B.
Figure 3B:
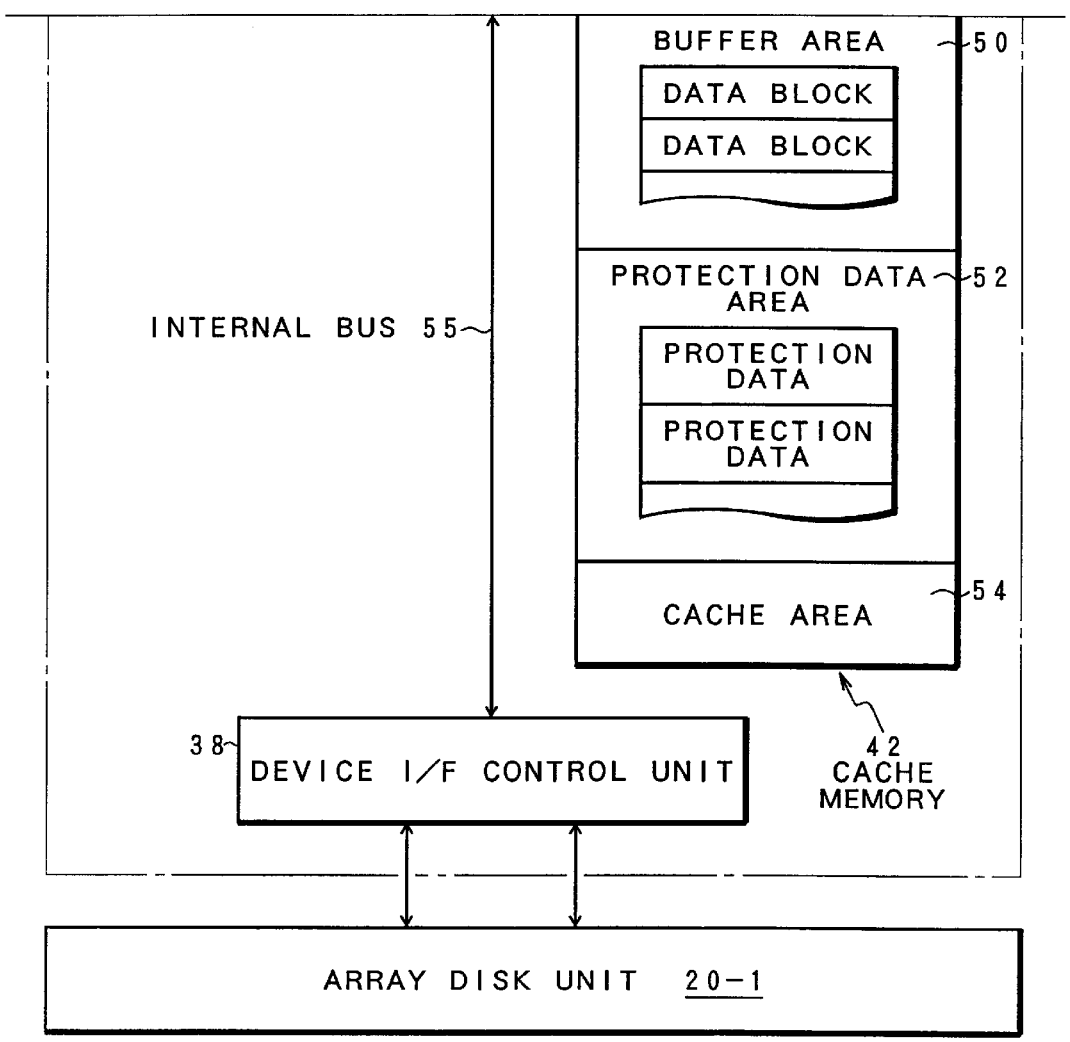

FIGS. 3A and 3B are block diagrams of the RAID controller 18-1 in FIGS. 1A and 1B and each of the other RAID controllers 18-2 and 18-3 also has the same construction as that of the RAID controller 18-1. The RAID controller 18-1 is constructed by: an MPU 32 as a main control unit; a main memory 34 in which a main program 35 which is executed by the MPU 32 has been stored; a host interface control unit 36; a device interface control unit 38; a cache control unit 40; and a cache memory 42. The inside of the cache memory 42 is divisionally constructed by: a cache management table area 48 to store management information of the storage data; a buffer area 50 to temporarily store the user data transferred from the host via an internal bus 55; a protection data area 52 to store the protection data of the data stored in the buffer area 50; and a cache area 54 to store the user data with the protection data transferred via the internal bus 55 from the array disk unit 20-1. Among them, the cache management table area 48 has: a cache management table 44 to manage the user data in the buffer area 50 and cache area 54; a protection data management table 45 to manage the protection data in the protection data area 52 and the user data in the buffer area 50; and further, an intermediate protection data management table 46 to record the state at the time of interruption of the transfer of the user data. The cache management table 44, protection data management table 45, and intermediate protection data management table 46 are developed in the cache control unit 40 and used for a control process of a protection data control unit 62 provided as hardware. When the user data that is sent from the host interface control unit 36 via the internal bus 55 is stored into the cache memory 42, the protection data control unit 62 forms the protection data on a data block unit basis, adds it to the end of the data block, separately stores the resultant data into the buffer area 50 as shown in data blocks 98-1 and 98-2 and into the protection data area 52 as shown in protection data 102-1 and 102-2, respectively. The protection data control unit 62 detects the interruption of the transfer of the data block, copies the circuit state of the circuit to form the protection data at that time into the intermediate protection data management table 46, and stores it therein.

As an interruption of the transfer of the data block, there are the following two cases.

I. Transfer interruption in the data block boundary portion

II. Transfer interruption in the halfway of the data block

Since the former transfer interruption in the data block boundary portion is the transfer interruption at a point of completion of the transfer of one data block, the formation of the protection data of the data block just before the interruption is completed. It is sufficient that the circuit state of formation of the protection data at that time, namely, a state where the formation of the protection data is completed with respect to the data block is merely stored into the intermediate protection data management table 46. On the other hand, in the latter case where the transfer is interrupted in the halfway of the data block, since the formation of the protection data of the interrupted block is in the halfway state, the protection data during the formation is temporarily stored in the protection data area 52 and the circuit state of formation of the protection data is also stored into the intermediate protection data management table 46. When the restart of the transfer of the interrupted data block is detected, the protection data control unit 62 sets the circuit state upon interruption stored in the intermediate protection data management table 46 into the hardware of the protection data control unit 62 and forms the protection data in parallel with the restarted data block. In this case, at the time of restart for the interruption in the block boundary portion, it is sufficient to newly form the protection data from the head of the next data block and fundamentally use initial values as parameters to form the protection data. On the other hand, at the time of restart after the interruption in the halfway of the data block, since the protection data of the interrupted data block is in the halfway of the formation, the protection data during the formation stored temporarily in the protection data area 52 is set into the protection data control unit 62. The formation of the protection data is continuously performed until the end of the data block from the halfway of the restarted data block. The protection data specified by the end of the transfer of the data block is added after the data block and the resultant data is sent to the cache memory 42. The data block is stored into the buffer area 50 and the protection data is stored into the protection data area 52, separately.

Figure 4A:
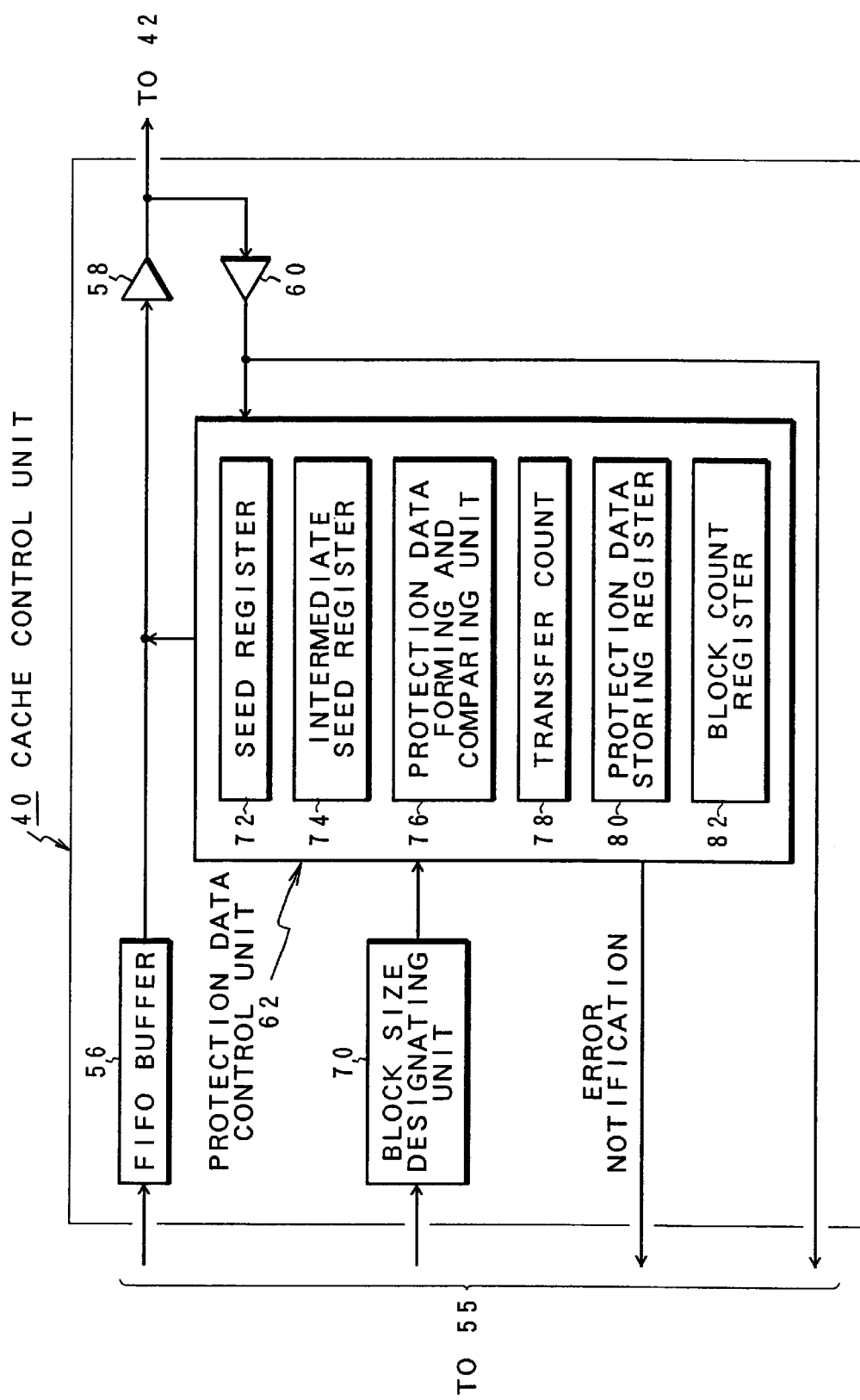
FIGS. 4A and 4B are block diagrams of a protection data control function provided in a cache control unit in FIGS. 3A and 3B.
Figure 4B:
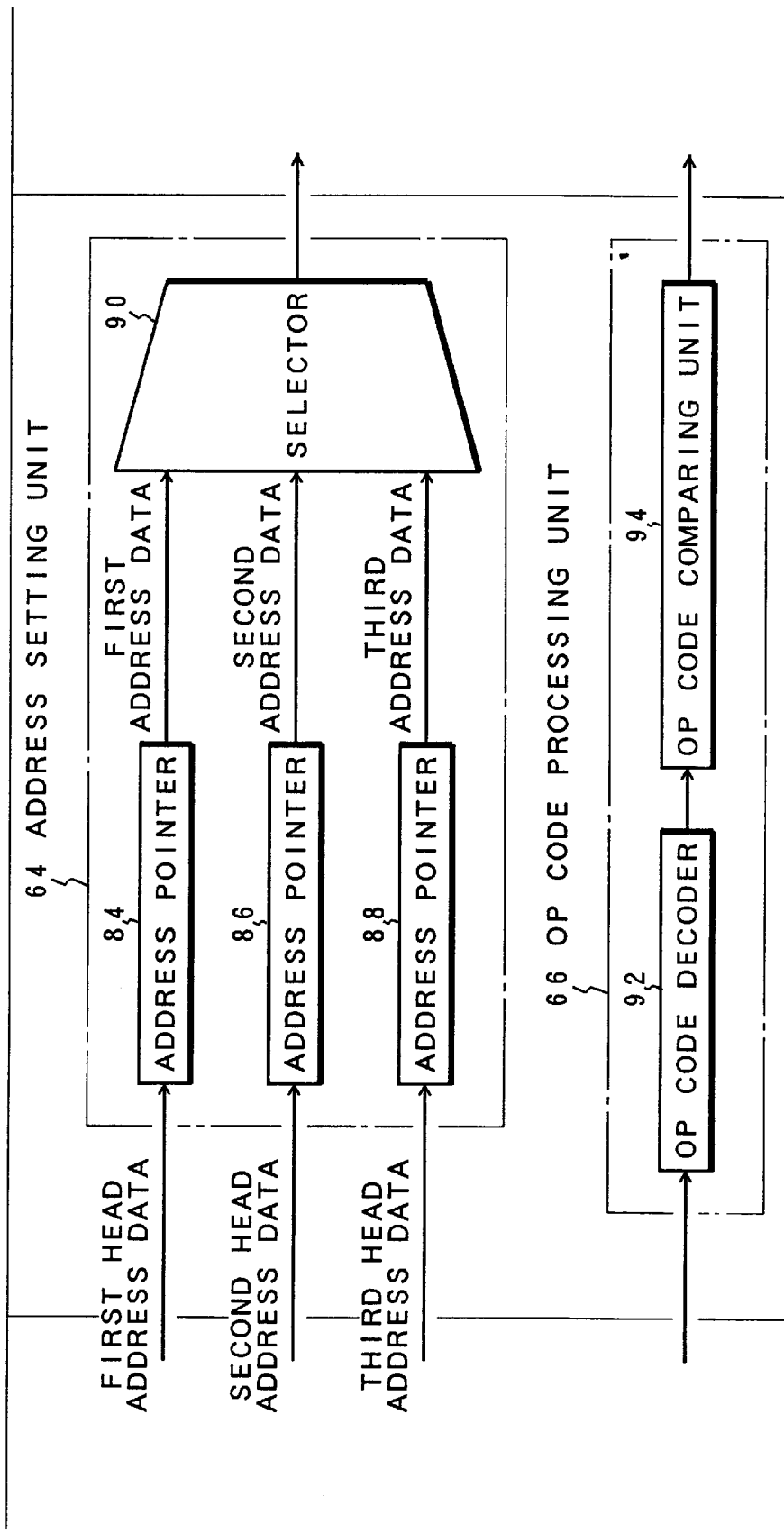

FIGS. 4A and 4B are diagrams showing a functional block which is realized by the hardware of the protection data control unit 62 provided in the cache control unit 40 in FIGS. 3A and 3B. The user data from the internal bus 55 is stored in an FIFO buffer 56, for example, on a byte unit basis and, thereafter, sent to the cache memory 42 side through a driver 58. At the same time, the user data is supplied to the protection data control unit 62 via a driver 60. The data from the cache memory 42 is sent to the internal bus 55 through the driver 60 and also supplied to the protection data control unit 62 in this case. To form the protection data in parallel with the transfer of the data block of the user data, a seed register 72, an intermediate seed register 74, a protection data forming and comparing unit 76, a transfer count 78, a protection data storing register 80, and a block count register 82 are provided for the protection data control unit 62. The seed register 72 sets an initial value of the protection data which is formed by the protection data forming and comparing unit 76. A value obtained by increasing the initial value in the seed register 72 at every end of transfer of the data block is set into the intermediate seed register 74. The protection data forming and comparing unit 76 first uses the initial value in the seed register 72, uses the intermediate seed value in the intermediate seed register 74 with respect to the second and subsequent blocks, and forms the intermediate protection data in parallel with the transfer of the byte data of one data block from the FIFO buffer 56. At the end of the data block, the unit 76 adds the formed protection data to the end of the data block and transfers the resultant data to the cache memory 42 from the driver 58. A size of data block of the user data serving as a formation unit of the protection data is set into the transfer count 78, sequentially subtracted by the byte transfer of the data block, and set to "0" at the end of the transfer of the data block. The setting of the block size into the transfer count 78 is performed by a block size designating unit 70. The block size of user data, for example, the size of 512 bytes is set into the transfer count 78. An address setting unit 64 and an OP code processing unit 66 shown on the lower side in the diagrams are also included in the protection data control unit 62. Address pointers 84, 86, and 88 and a selector 90 are provided in the address setting unit 64. First head address data, second head address data, and third head address data which are designated by the respective management tables read out from the cache management table area 48 in FIGS. 3A and 3B are set into the address pointers 84, 86, and 88. Those address data is increased each time the data block of the user data is transferred and becomes first address data, second address data, and third address data for the selector 90, respectively. The first head address data designates an address in the cache area 54 in FIGS. 3A and 3B. The second head address data designates an address in the protection data area 52. Further, the third head address data designates an address in the buffer area 50. When the user data from the host is written into the cache memory 42, the selector 90 first selects the third address data from the address pointer 88 and stores the data block into the address in the buffer area 50 designated by the third address data. When the storage of the data block is finished, in order to store the protection data which is simultaneously formed, the selector 90 is switched to the second address data from the address pointer 86 and the protection data is stored at the address position in the protection data area 52 designated by the second address data. On the other hand, when the cache area 54 in which the user data as a data block with the protection data read out from the array disk unit 20-1 has been stored is accessed, the selector 90 is switched to the first address data from the address pointer 84, thereby allowing the access to be performed from the address designated by the first address data in the cache area 54. The OP code processing unit 66 has an OP code decoder 92 and an OP code comparing unit 94. The OP code processing unit 66 compares the OP code formed from the address information obtained in accordance with the data transfer state by the host interface control unit 36 with the table OP code stored in the protection data management table 45 or intermediate protection data management table 46 set by the main program 35 which is executed by the MPU 32. When they coincide, the OP code processing unit 66 detects the transfer start, transfer interruption, or transfer restart of the user data and allows the formation of the protection data, storage in association with the interruption, reconstruction in association with the restart, and the formation of the protection data by the protection data control unit 62 to be executed.

Figure 5:
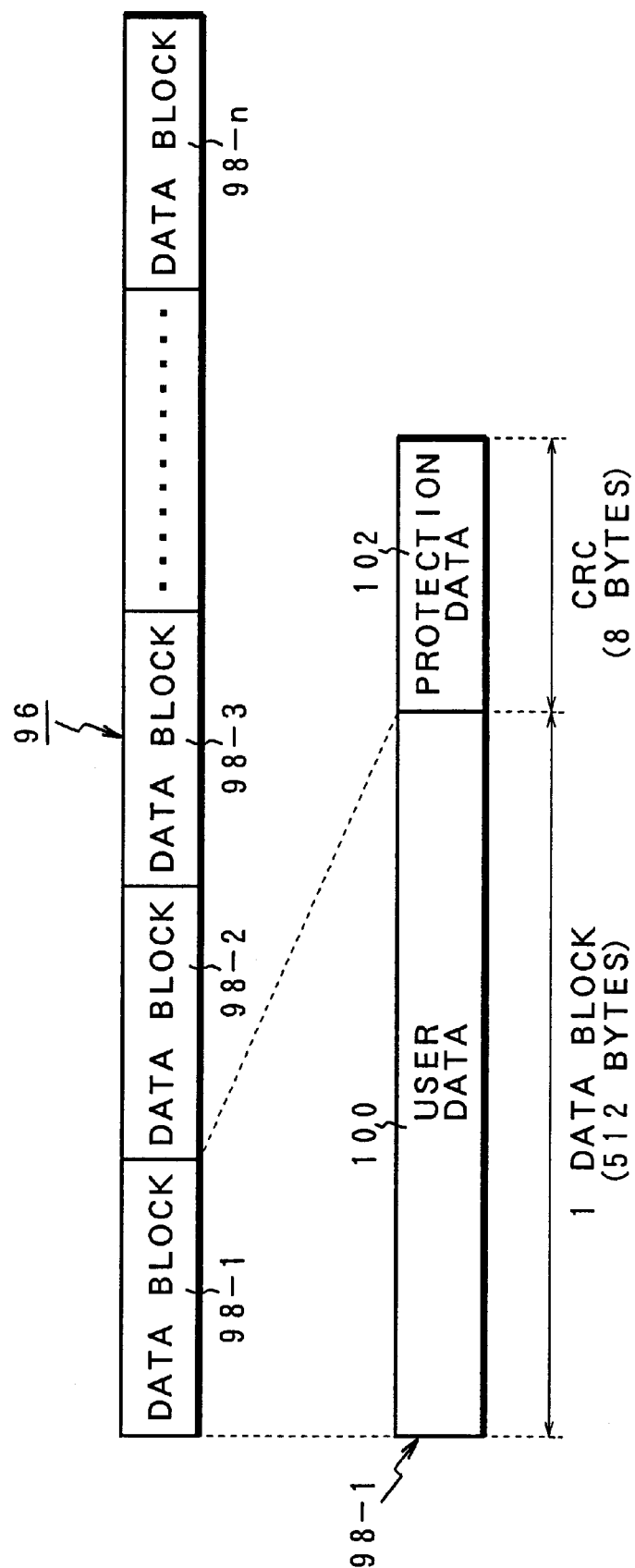
FIG. 5 is an explanatory diagram of a format of protection data which is formed from a data block from a host interface control unit in FIGS. 3A and 3B and added.

FIG. 5 is an explanatory diagram of the user data which is transferred from the host and the protection data which is formed on a data block unit basis of the user data. Host transfer data 96 is sent from the host interface control unit 36 in FIGS. 3A and 3B to the cache control unit 40 through the internal bus 55. The host transfer data 96 is divided into data blocks 98-1 to 98-n each having a block size of, for example, 512 bytes. As shown with respect to the head data block 98-1, a CRC of, for instance, 8 bytes formed by the protection data control unit 62 is added as protection data 102 to the end of one data block as user data 100, and the resultant data is stored into the cache memory. The user data 100 and protection data 102 of one data block are separately stored into the buffer area 50 and protection data area 52 in the cache memory 42.

Figure 6:
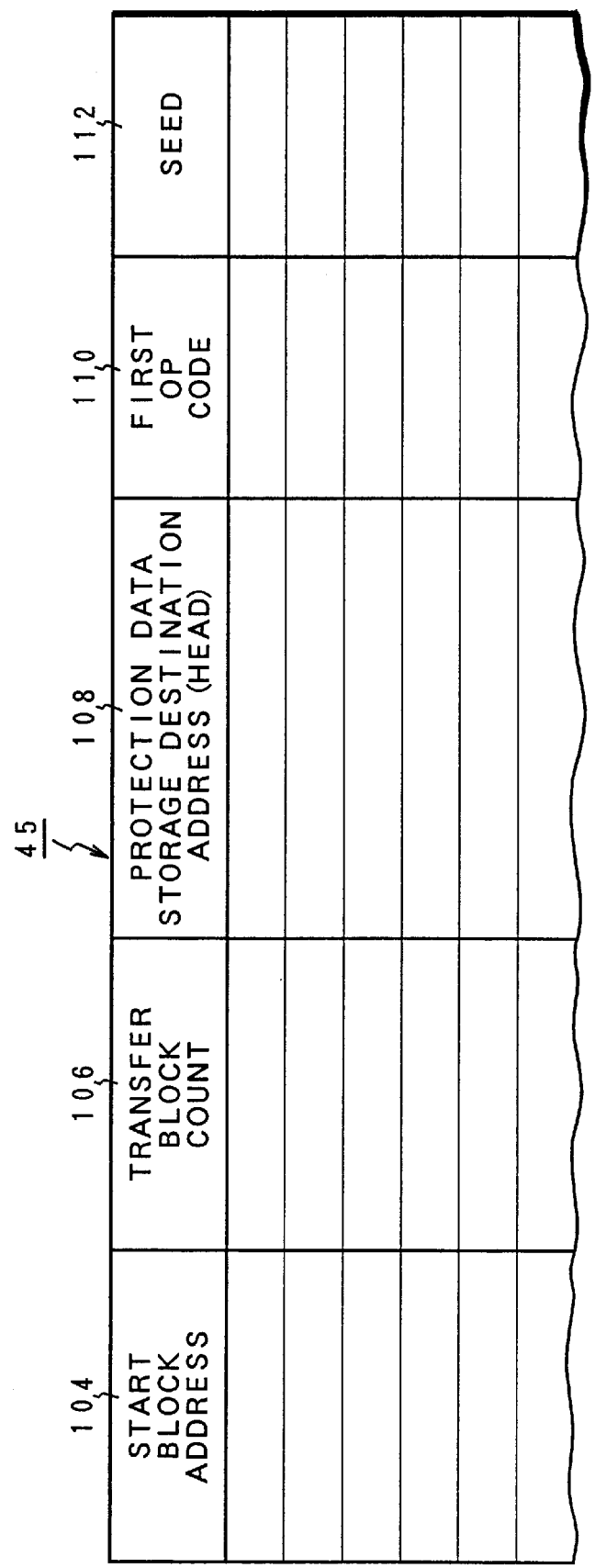
FIG. 6 is an explanatory diagram of a protection data management table in FIGS. 3A and 3B.

FIG. 6 is an explanatory diagram of the protection data management table 45 stored in the cache management table area 48 in FIGS. 3A and 3B. The protection data management table 45 is constructed by: a start block address 104 showing a start block address of the transfer data; a transfer block count 106 showing the number of blocks to be transferred; a protection data storage destination address (head) 108 showing a write destination address in the protection data area 52 of the protection data; a seed 112 showing the initial value of the protection data; and further, a first OP code 110 including those set values as one group.

Figure 7:
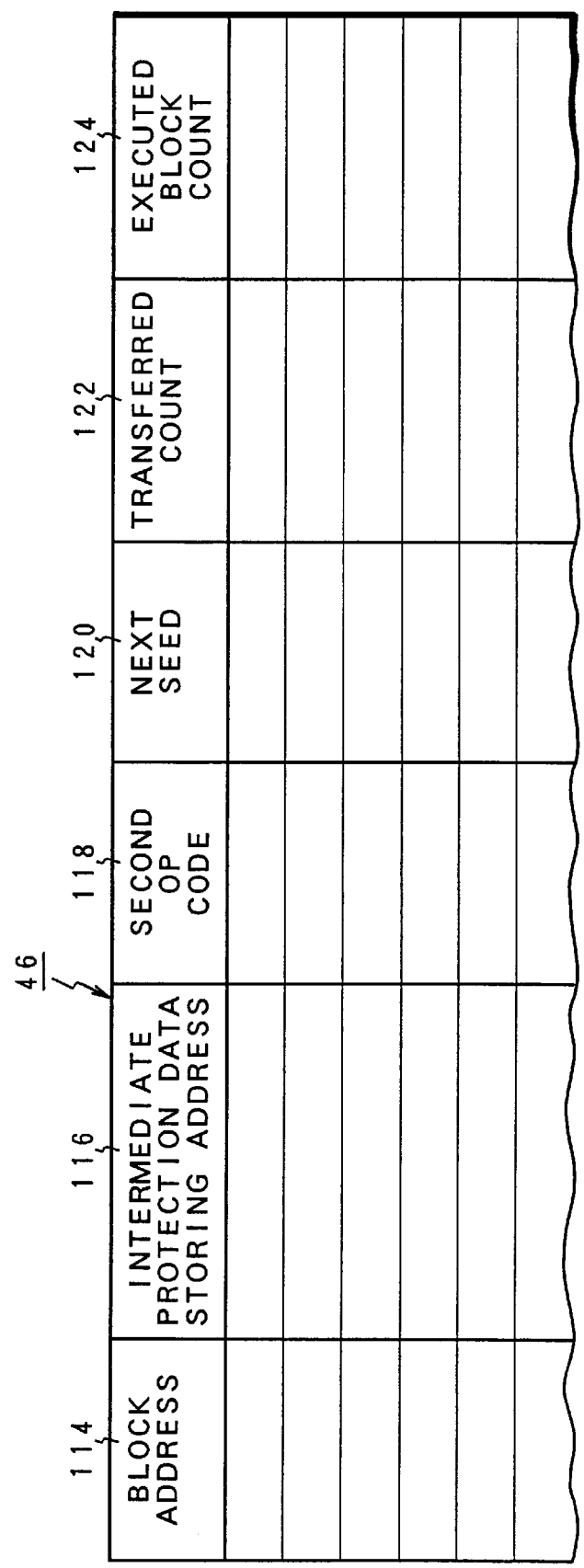
FIG. 7 is an explanatory diagram of an intermediate protection data management table in FIGS. 3A and 3B.

FIG. 7 is an explanatory diagram of the intermediate protection data management table 46 provided in the cache management table area 48 in FIGS. 3A and 3B. The intermediate protection data management table 46 is constructed by: a block address 114 showing the block address in which the transfer interruption occurred; an intermediate protection data storing address 116 showing the storing position in the protection data area 52 of the protection data at the time of transfer interruption; a next seed 120 showing an intermediate seed value at the time of transfer interruption which was increased every transfer of the data block; a transferred count 122 showing the number of remaining bytes at the time of transfer interruption; an executed block count 124 showing the number of remaining blocks at the time of transfer interruption; and further, a second OP code 118 including those set values upon transfer interruption as one group.

Writing Operation into the Cache Memory

First, with respect to the protection data control unit 62 in FIGS. 4A and 4B, the writing operation into the cache memory 42 in the case where the user data was normally sent from the host interface control unit 36 without causing a transfer interruption will be described. When the host interface control unit 36 receives a write command from the channel controller 16-1, the MPU 32 develops the cache management table 44, protection data management table 45, and further, intermediate protection data management table 46 stored in the cache management table area 48 in the cache memory 42 for the protection data control unit 62 of the cache control unit 40 by the main program 35. The setting and the management of the necessary information such as a write destination address serving as a storage destination and the like are performed. When the cache management table 44 and protection data management table 45 are set in this manner, the hardware of the protection data control unit 62 in FIGS. 4A and 4B executes the following processes. First, the address information from the host interface control unit 36 is received by the OP code decoder 92 provided in the OP code processing unit 66. The first OP code to search the protection data management table 45 is included in the address information. The first OP code is formed by the OP code decoder 92 and sent to the OP code comparing unit 94. The OP code comparing unit 94 compares the first OP code formed from the address information with the first OP code 110 read out from the protection data management table 45, thereby searching the relevant table information. At this time, if the first OP code formed from the address information cannot be detected from the protection data management table 45, an error is notified to the MPU 32. On the other hand, if the relevant first OP code 110 is detected from the protection data management table 45, the protection data storage destination address 108 and seed 112 which were grouped by the relevant first OP code 110 are read out from the protection data management table 45 and sequentially set into the second head address for the address pointer 86 and the seed register 72, respectively. The block size, for example, 512 bytes designated by the block size designating unit 70 is copied to the transfer count 78. Further, the address information sent from the host interface control unit 36 is set into the third head address data of the address pointer 88. The address pointers 86 and 88 generate the second address data and third address data which were increased every transfer of the data block to the selector 90. In the first block transfer, the selector 90 selects the third address data from the address pointer 88 and designates the address in the buffer area 50 to store the head block data. When the data is transferred subsequently to the address information from the host interface control unit 36, the protection data control unit 62 subtracts the transfer count 78 each time the byte data is received and counts a data transfer amount. The protection data forming and comparing unit 76 uses the seed reset in the seed register 72 as an initial value and executes the formation of the intermediate protection data on a byte data unit basis of the data block which is inputted from the driver 60 and passes through the cache control unit 40. When the transfer count 78 is set to "0" by the writing to the cache due to the transfer of the byte unit of the data block as mentioned above, the transfer of one data block of 512 bytes is finished. The selector 90 switches the address into the cache memory 42 to the address data from the address pointer 86. In this instance, in the protection data forming and comparing unit 76, the formation of the protection data of one data block is completed and the protection data is written at the address position in the protection data area 52 of the cache memory 42 by the second address data selected by the selector 90. When the writing of the protection data is completed, the selector 90 again switches the address data to the third address data from the address pointer 88. At this time, since the address pointer 88 generates the third address data which was increased by "1", the write address in the buffer area 50 of the next data block is designated. When the transfer count 78 is set to "0" by the end of transfer of the data block, each of the block count register 82 and seed register 72 is increased by "1". Further, the transfer count 78 is reset to the value of, for example, 512 bytes designated by the block size designating unit 70 and prepares for the subtraction due to the byte transfer of the next data block. When the transfer count 78 is set to "0" and the block count register 82 is increased by "1", the increased count value is compared with the number of transfer blocks of the transfer block count 106 in the protection data management table 45 at that time. In this instance, if the value of the block count register 82 and the value of the transfer block count 106 in the table coincide, it is determined that the transfer of the user data designated by the first OP code 110 at that time is completed. When the completion of the data transfer is decided, the relevant first OP code 110 indicates the transfer completion and the code contents are changed to, for example, all "0" so that the code does not become the search target of the first OP code at the time of next transfer start.

Writing Operation to the Cache Memory Upon Transfer Interruption

When a transfer interruption occurs during the transfer of a certain data block, a change occurs in the OP code formed from the address information from the host interface control unit 36 given to the OP code decoder 92 of the OP code processing unit 66. Since the OP code comparing unit 94 compares the OP code with the first OP code in the table, the transfer interruption is detected from the change in OP code in association with the data transfer. When the transfer interruption is detected, the protection data control unit 62 discriminates the value of the transfer count 78 at that time and the value of the block count register 82. If the transfer count 78 is equal to "0" in this instance and the value of the block count register 82 and the value of the transfer block count 106 in the table are different, it is determined that the data transfer was interrupted at the boundary of the data block. In this case, the set values of the transfer count 78 and block count register 82 in the protection data control unit 62, the second address data from the address pointer 86, and the set value in the seed register 78 are copied into the transferred count 122, executed block count 124, intermediate protection data storing address 116, and next seed 120 in the intermediate protection data management table 46 in FIG. 7, respectively. When the transfer count 78 is not equal to "0", it is decided that the data transfer was interrupted in the halfway of the data block. In this instance, the intermediate protection data until such a time point which was formed in the protection data forming and comparing unit 76 is temporarily written into the protection data area 52 of the cache memory 42 which is designated by the second address data. In this case, the increasing operation of the second address data by the address pointer 86 is not performed. The set values of the transfer count 78 and block count register 82 in the protection data control unit 62, the unincreased second address data from the address pointer 86, and the set value in the seed register 72 are copied into the transferred count 122, executed block count 124, intermediate protection data storing address 116, and next seed 120 in the intermediate protection data management table 46 in FIG. 7, respectively.

The copied set values are grouped into one by the second OP code 118. While the process for copying the set values in the protection data control unit 62 in association with the transfer interruption to the intermediate protection data management table 46 as mentioned above is executed, the data that is sent from the host interface control unit 36 is stored into the FIFO buffer 56. In this case, the FIFO buffer 56 has time of a buffer which is enough larger than the necessary processing time which occurs in the cache control and can absorb the time that is required to add the protection data to each data block. When the interrupted data transfer is now restarted, the OP code indicative of the transfer restart is set into the second OP code 118 at the relevant table position in the intermediate protection data management table 46 in FIG. 7 by the main program 35 executed by the MPU 32. At the same time, the OP code from the host interface control unit 36 is decoded by the OP code decoder 92, thereby forming the second OP code. The coincidence between the second OP code formed from the address information in association with the transfer restart and the relevant second OP code due to the search of the intermediate protection data management table is detected by the OP code comparing unit 94. Therefore, a process for returning the set values in the intermediate protection data management table 46 which were grouped by the coincident second OP code 118 to the protection data control unit 62 and setting the state to the state upon interruption is performed. That is, the set values in the intermediate protection data storing address 116, transferred count 122, executed block count 124, and next seed 120 corresponding to the second OP code 118 in the intermediate protection data management table 46 in FIG. 7 are read out and copied into the second head address for the address pointer 86, transfer count 78, block count register 82, and seed register 72 in the protection data control unit 62 in FIGS. 4A and 4B, respectively. In this instance, if the value of the transferred count 122 read out from the table is not equal to "0" because the transfer is interrupted in the halfway of the data block, the intermediate protection data stored upon interruption is read out from the protection data area 52 of the cache memory 42 and set into the intermediate seed register 74. Until the end of the block after the interruption at which the transfer count 78 is set to "0" for the first time, the formation of the protection data in association with the byte transfer of the data block which was restarted is continued in the protection data forming and comparing unit 76 by using the value in the intermediate seed register 74. Thus, when the data transfer is restarted, the state of the protection data control unit 62 at the time of interruption is reconstructed and the formation of the protection data can be continuously executed by using the protection data in the halfway of the formation.

Figure 8A:
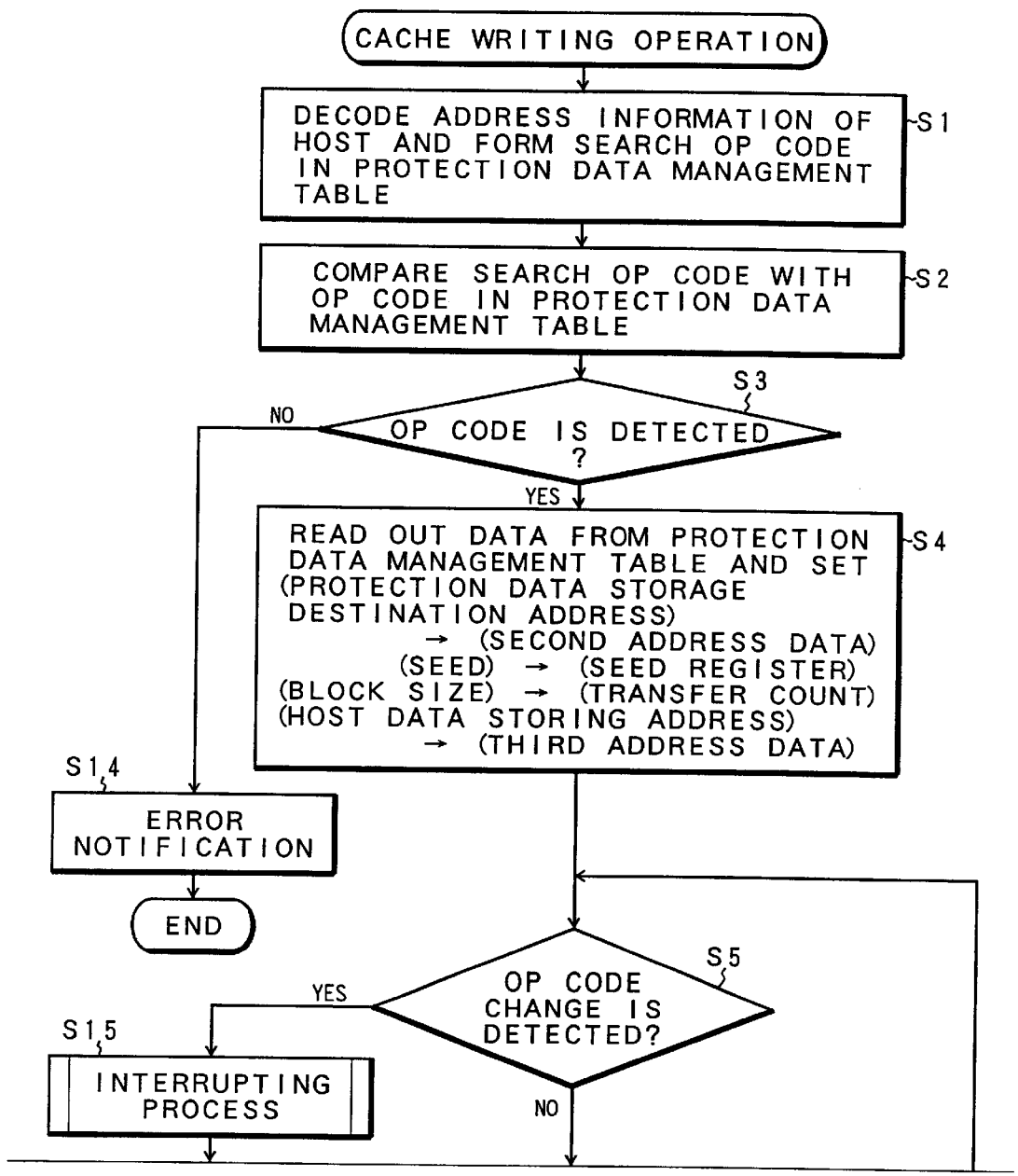
FIGS. 8A and 8B are flowcharts for the cache writing operation according to the invention.
Figure 8B:
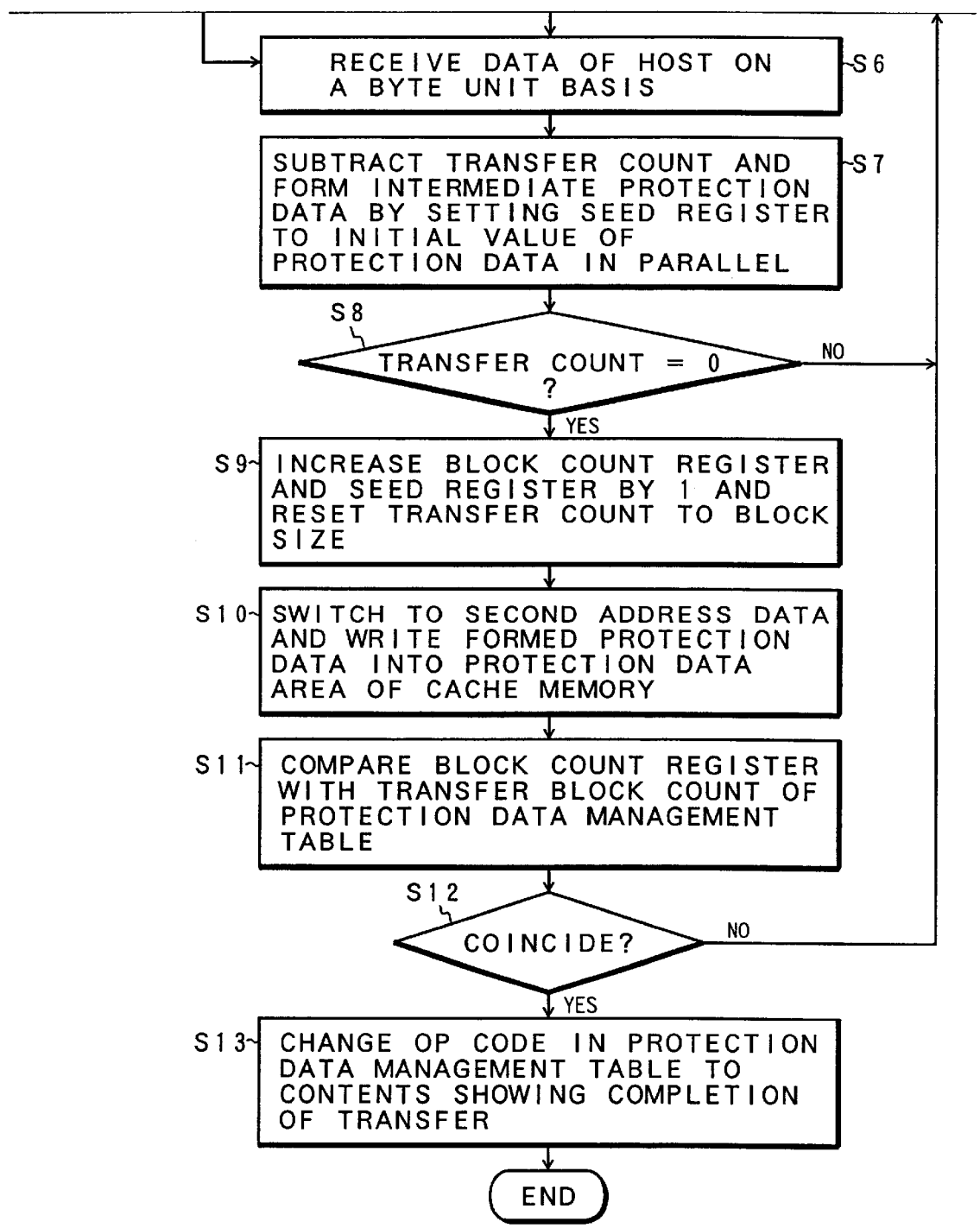
Figure 9A:
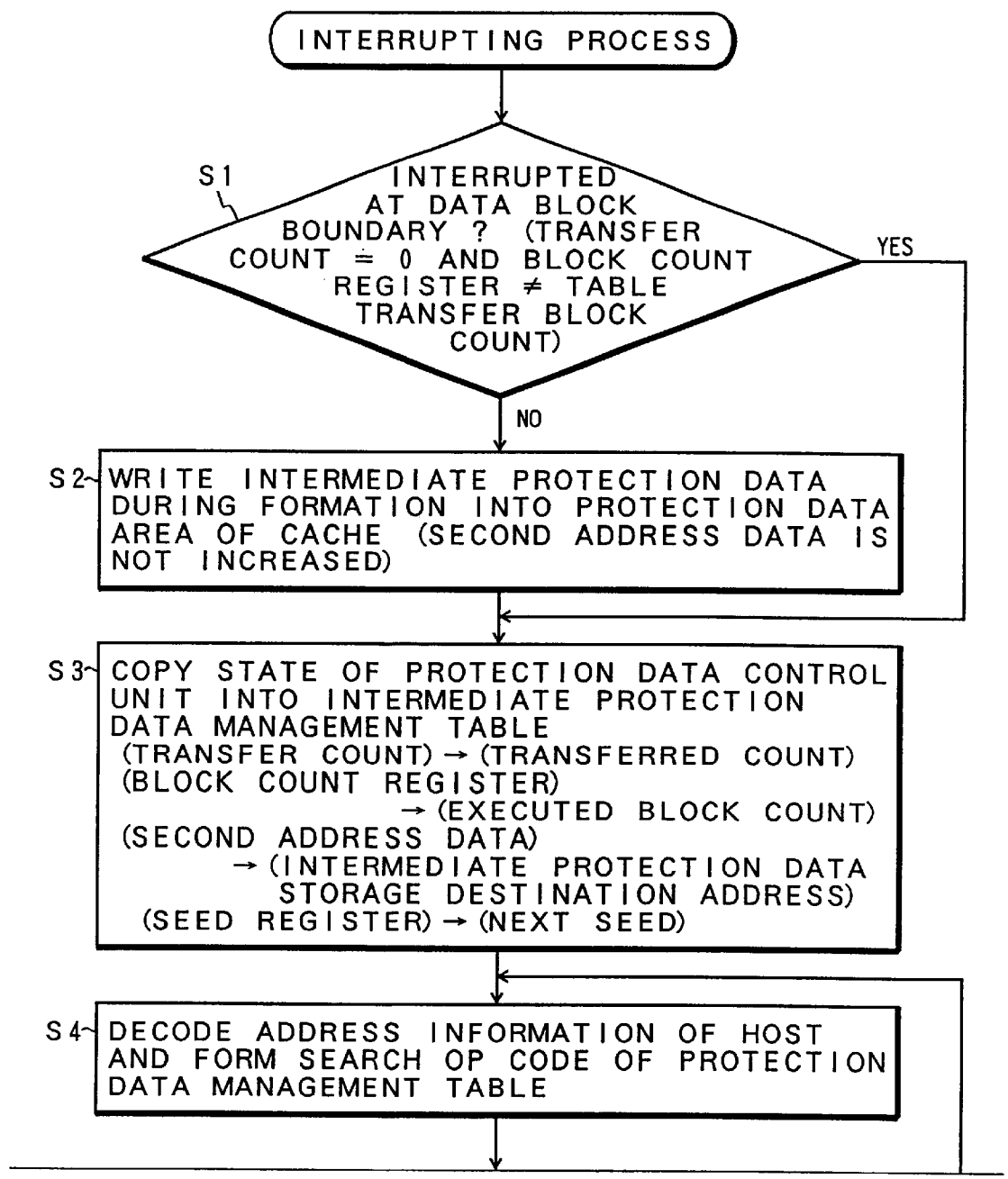
FIGS. 9A and 9B are detailed flowcharts for an interrupting process in FIGS. 8A and 8B.
Figure 9B:
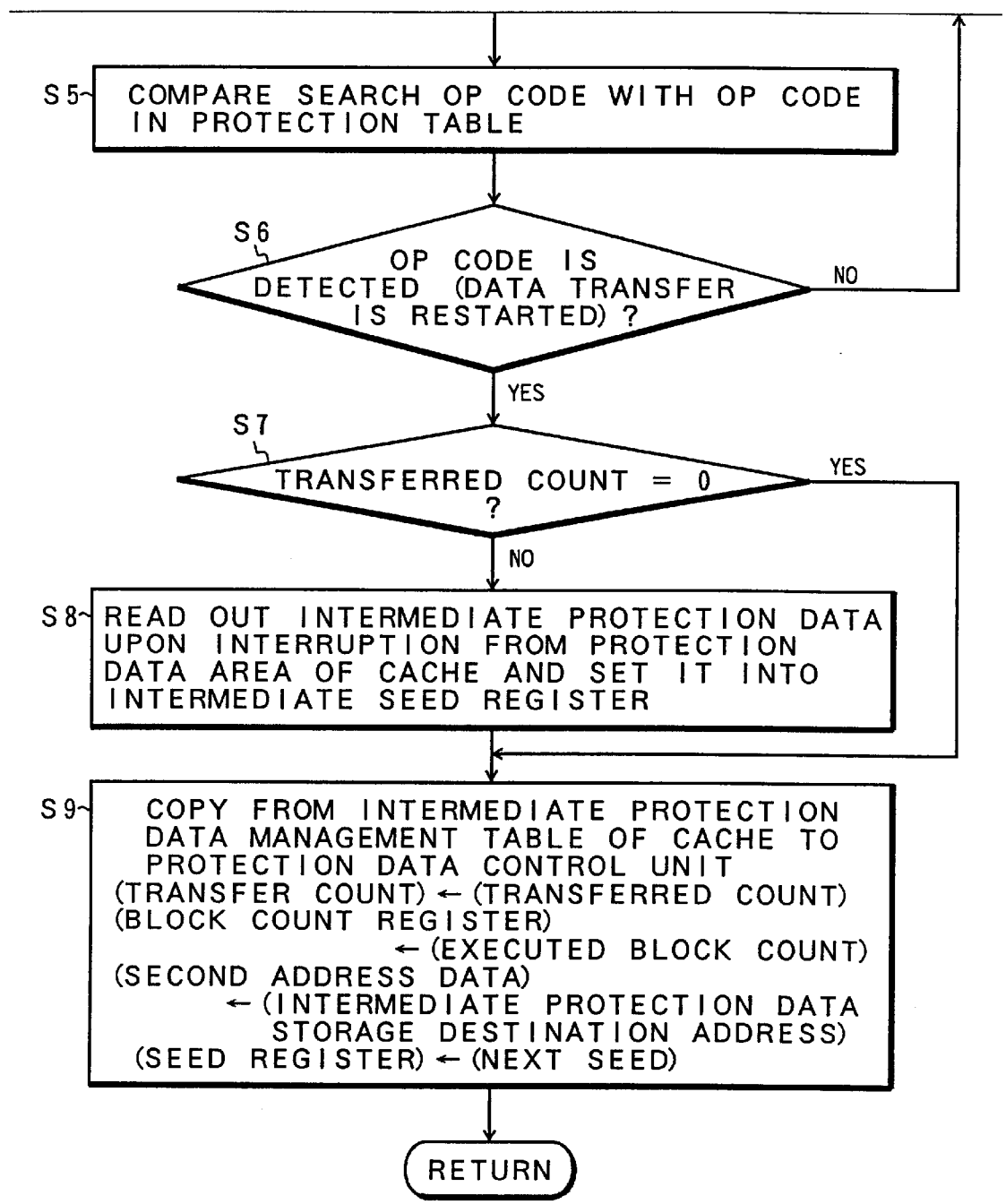

FIGS. 8A and 8B are flowcharts for the cache writing operation. FIGS. 9A and 9B show the intermediate processing unit at the time of occurrence of the transfer interruption as a subroutine. In FIGS. 8A and 8B, the address information from the host is decoded and the search OP code in the protection data management table 45 is formed in step S1. In step S2, the search OP code is compared with the table OP code. When the OP code can be detected in step S3, the data is read out from the protection data management table 45 and set into the protection data control unit 62 in step S4. If the table OP code cannot be detected in step S3, an error is notified to the MPU 32 in step S14. As mentioned above, when the setting of the set values from the protection data management table 45 into the protection data control unit 62 is finished, the presence or absence of a change in OP code is discriminated in step S5. After that, the data block from the host is received on a byte unit basis in step S6. The value of the transfer count 78 is subtracted and the intermediate protection data is formed in parallel by the protection data forming and comparing unit 76 by using the protection data in the seed register 72 as an initial value in step S7. In step S8, the end of the transfer of the data block is discriminated by checking whether the transfer count 78 is equal to "0" or not. When the transfer count 78 is equal to "0" and the transfer of the data block is finished, the values in the block count register 82 and seed register 72 are increased by "1" and, further, the transfer count 78 is reset to the block size, for example, 512 bytes in the block size designating unit 70 in step S9. Subsequently, in step S10, the selector 90 is switched to the second address data of the address pointer 86 and the formed protection data is written into the protection data area 52 of the cache memory 42. With respect to the data block, in parallel with the formation of the protection data in steps S5 to S8, the buffer area 50 in the cache memory 42 is designated by the selection of the third address data from the address pointer 88 by the selector 90 and the writing operation has already been finished. In step S11, the value in the block count register 82 is compared with the value in the transfer block count 106 in the protection data management table 45. When they do not coincide in step S12, the processing routine is returned to step S5 and the processes of the next data block are executed. If they coincide in step S12, this means that the processes of all of the data blocks of the user data are finished. Therefore, step S13 follows and the contents of the OP code in the protection data management table 45 are changed to a state of, for example, all "0" indicative of the transfer completion and the cache writing operation is finished. In step S5, the change in OP code due to the transfer interruption is checked during the cache writing operation of the user data. When the change in OP code is detected, the interrupting process is executed in step S15.

In the interrupting process, as shown in the flowcharts of the subroutine of FIGS. 9A and 9B, whether the transfer has been interrupted at the boundary of the data block or not is discriminated in step S1. Specifically speaking, if the transfer count 78 of the protection data control unit 62 is equal to "0" and the value in the block count register 82 and the value of the transfer block count 106 in the table do not coincide, it is determined that the transfer was interrupted at the boundary of the data block, so that step S3 follows. If this condition is not satisfied, it is determined that the transfer was interrupted in the halfway of the data block. In step S2, the intermediate protection data in the halfway of the formation is written into the protection data area 52 of the cache memory 42. In this case, the increasing operation by the address pointer 86 of the second address data which designates the value written in the protection data area is not performed. In step S3, the state of the protection data control unit 62 is copied into the intermediate protection data management table 46. Subsequently, in steps S4 to S6, in a manner similar to the case of steps S1 to S3 in the cache writing operation in FIGS. 8A and 8B, the change in OP code in association with the transfer restart is detected. When the change in OP code is detected, step S7 follows and a check is made to see if the transferred count 122 in the intermediate protection data management table 46 is equal to "0". If the transferred count is equal to "0", since this means that the transfer was interrupted at the boundary of the data block, step S9 follows. If the transferred count 122 is not equal to "0", since this means that the transfer was interrupted in the halfway of the data block, in this case, the intermediate protection data which was temporarily stored upon interruption is read out from the protection data area 52 in the cache memory 42 and set into the intermediate seed register 74 in step S8. In step S9, the values stored in the table are copied from the intermediate protection data management table 46 to the protection data control unit 62 and the state is returned to the same state as that upon interruption. The processing routine is returned to step S6 in FIGS. 8A and 8B. The formation of the protection data in association with the transfer of the restarted data block is continued.

Writing Operation to the Cache Memory from the Device

In FIGS. 3A and 3B, in the writing operation such that the transfer data from the array disk unit 20-1 read out by the device interface control unit 38 is written into the cache area 54 of the cache memory 42 from the cache control unit 40, since all of the transfer data from the device interface control unit 38 to the cache memory 42 can be managed by the main program 35 which is executed by the MPU 32, a situation such that the data transfer is interrupted does not occur. Since the user data which is read out from the array disk unit 20-1 also has a data format in which the protection data 102 is added after the user data 100 in FIG. 5 at the time of disk writing, there is no need to form the protection data by the cache control unit 40 when the data is written into the cache memory 42. In this case, the protection data control unit 62 forms the protection data simultaneously with the writing of each data block with respect to the transfer data sent from the device interface control unit 38 via the internal bus 55 and compares the protection data formed in association with the data transfer with the protection data added to the end of the data block. When the protection data formed from the transfer data block and the protection data added to the transfer data block coincide, it is determined that the data could normally be written. The processing routine is finished as being normal. When they do not coincide, an error is notified to the MPU 32.

Reading Operation from the Buffer Area to the Host Side

In FIGS. 3A and 3B, it is now assumed that a reading request of the user data stored in the buffer area 50 is issued from the host interface control unit 36 to the cache control unit 40. It is also assumed that in the reading request from the host interface control unit 36, the block address in which the transfer of the data block was interrupted is not included. The protection data control unit 62 of the cache control unit 40 forms the first OP code by the OP code decoder 92 in FIGS. 4A and 4B on the basis of the address data which is sent from the host interface control unit 36 at the time of reading request and searches the protection data management table 45 by the OP code comparing unit 94. When the coincidence of the OP code is detected, the relevant protection data storage destination address 108 and seed 112 in the protection data management table 45 in FIG. 6 corresponding to the OP code are read out and set as second head address data for the address pointer 86 in FIGS. 4A and 4B. The seed is copied into the seed register 72. The address information of the reading request given from the host interface control unit 36 is set as third head address data into the address pointer 88. After completion of the setting of the protection data control unit 62 as mentioned above, the selector 90 is switched to the third address data from the address pointer 88. The data block is read out from the buffer area 50 designated by the third address data in the cache memory 42. The transfer count 78 is decreased in association with the byte transfer during the reading operation of the data block. When the transfer count 78 is equal to "0", the transfer completion of the data block is recognized. The selector 90 is switched to the second address data from the address pointer 86. The address in the protection data area 52 of the cache memory 42 is designated and the protection data is read out. When the data block is read out prior to reading out the protection data, the protection data forming and comparing unit 76 of the protection data control unit 62 has completed the formation of the protection data from the data block to be transferred. Therefore, the protection data read out from the protection data area 52 in the cache memory 42 is compared with the already formed protection data by the protection data forming and comparing unit 76 in parallel with the reading operation, so that validity of the read-out data is checked. In this instance, if an error about the validity is detected due to the data dissidence, an error is notified from the protection data control unit 62 to the MPU 32.

Figure 10A:
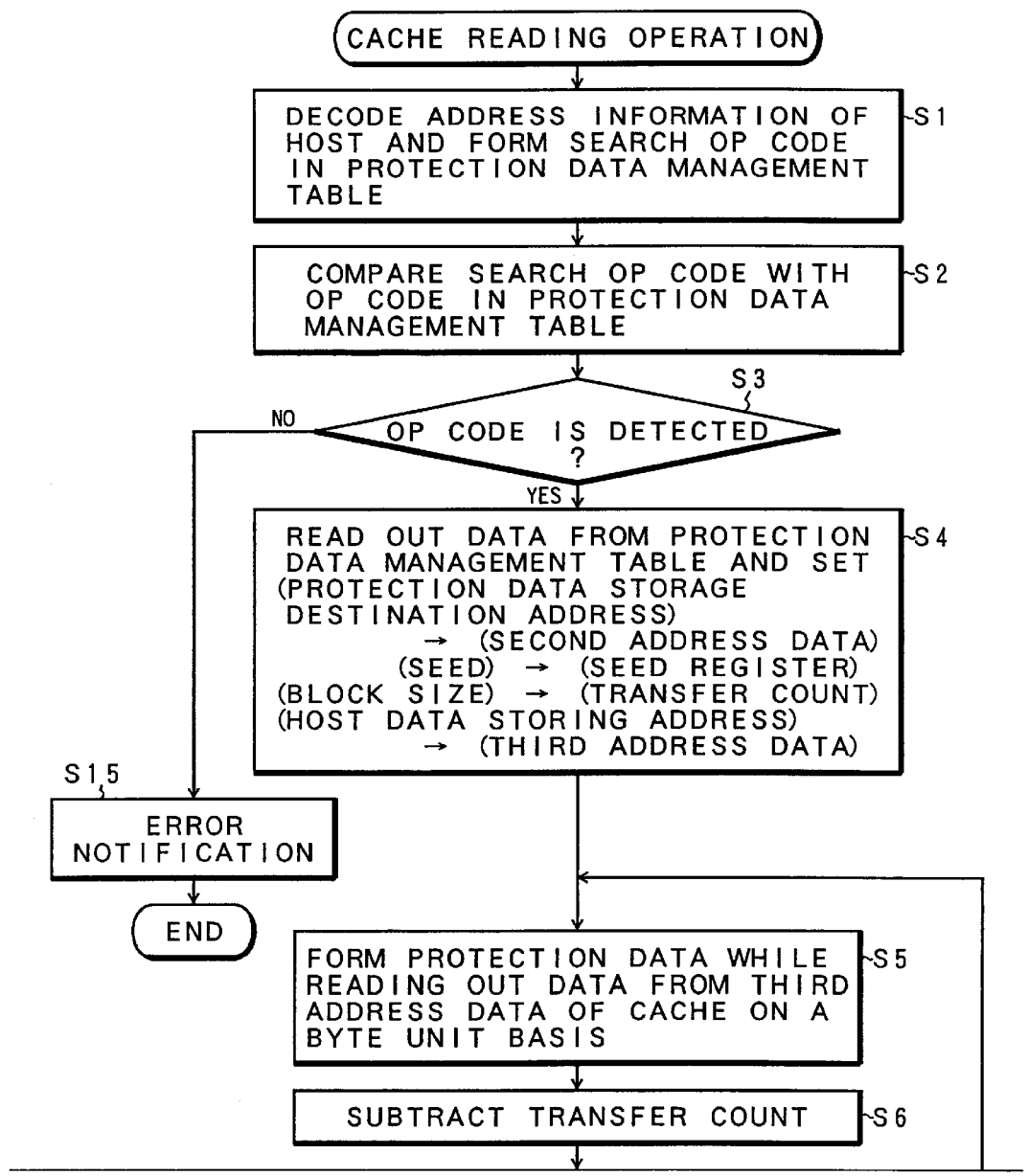
FIGS. 10A and 10B are flowcharts for the cache reading operation in the invention.
Figure 10B:
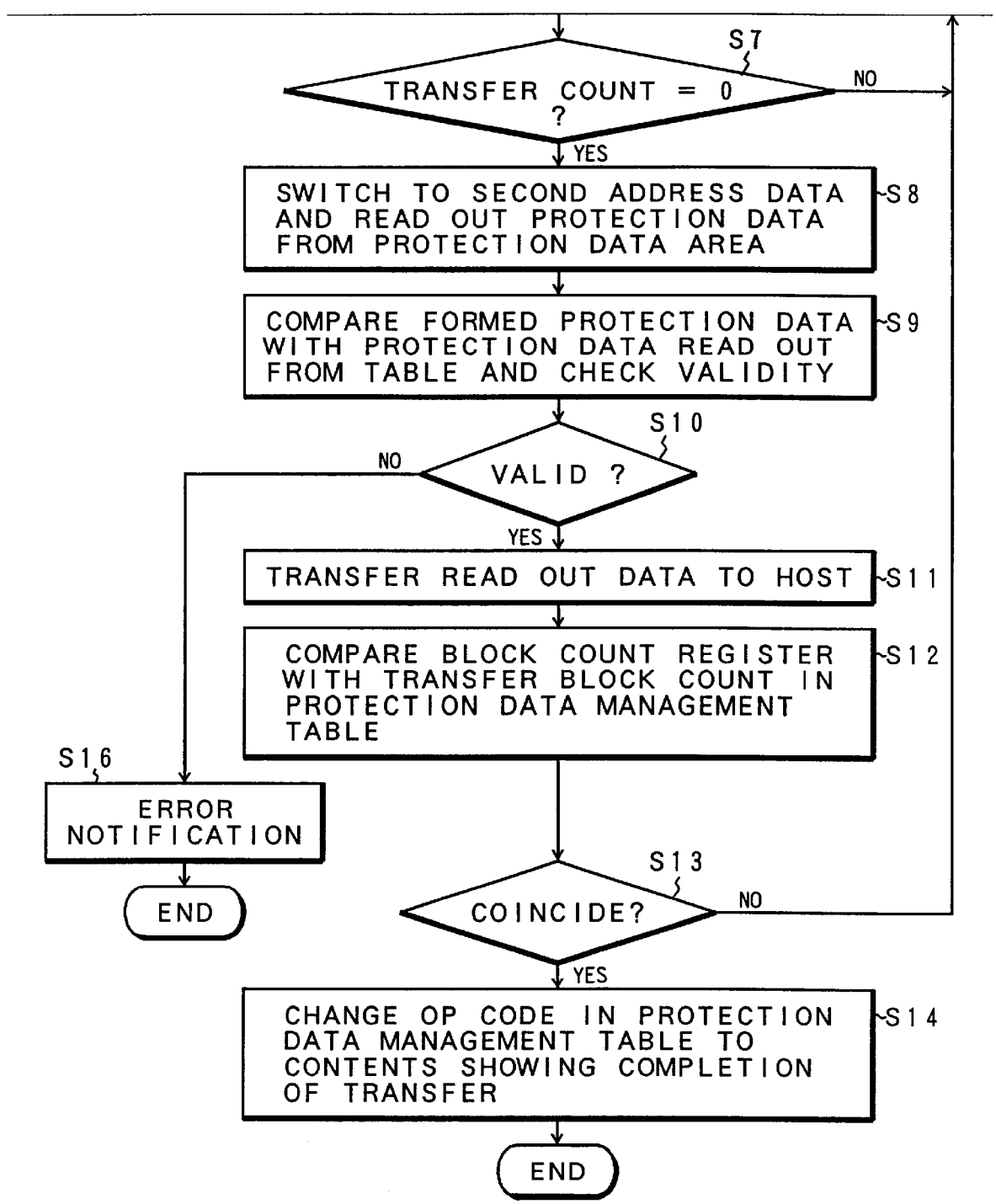

FIGS. 10A and 10B are flowcharts for such a cache reading operation. In step S1, the address information from the host interface control unit 36 is decoded and the first search OP code of the protection data management table 45 is formed. In step S2, the protection data management table 45 is searched and the search OP code is compared with the OP code in the table. In step S3, when the OP code which coincides with the OP code formed from the address information is detected due to the table search, step S4 follows. When no OP code is detected from the protection data management table 45, an error is notified to the MPU 32 in step S15. When the coincidence of the OP code in the protection data management table 45 is detected, the data is read out from the protection data management table 45 and set into the protection data control unit 62. Subsequently, in step S5, the protection data is formed while reading out the data block on a byte unit basis by the designation of the buffer area 50 in the cache memory by the third address data set from the address information. When the data of one byte is read out and transferred, the transfer count 78 is subtracted in step S6. In step S7, a check is made to see if the transfer count 78 has reached "0". When it reaches "0", it is determined that the transfer of the data block was finished. In step S8, the selector is switched to the second address data and the protection data is read out from the protection data area 52 in the cache memory 42. In step S9, the protection data which has already been formed is compared with the protection data read out from the cache memory, thereby checking the validity. If it is valid, the read-out data is transferred to the host in step S11. In the transfer of the data block to the host, the protection data added at the end of the data block is removed and only the data block is transferred. If the formed protection data and the protection data read out from the cache memory do not coincide in step S10, it is regarded that there is no validity. An error is notified to the MPU 32 in step S16. When only the data block is completely read out and transferred to the host in step S11, the value in the block count register 82 is compared with the value of the transfer block count 106 in the protection data management table 45 in step S12. The processes from step S5 are repeated until they coincide. Subsequently, in step S3, when the value in the block count register 82 and the value of the transfer block count 106 in the protection data management table 45 coincide, it is determined that the transfer of all of the data blocks was finished. In step S14, the first OP code in the protection data management table 45 is changed to the contents of, for example, all "0" indicative of the transfer completion. A series of processes is finished.

Reading Operation from the Cache Buffer Area to the Device Side

In FIGS. 3A and 3B, the reading operation to write the user data stored in the buffer area 50 of the cache memory 42 to the array disk unit 20-1 via the device interface control unit 38 is fundamentally the same as the reading operation for the host interface control unit 36. In this case, the reading operation for the device interface control unit 38 differs with respect to the following point. That is, although the protection data is removed and only the data block is transferred in case of the host, in the reading operation for the device interface control unit 38, the data with the format of FIG. 5 such that the protection data read out from the protection data area 52 was added after the data block read out from the buffer area 50 in the cache memory 42 is transferred. Specifically speaking, at the end of the transfer of the data block in which the transfer count 78 provided in the protection data control unit 62 in FIGS. 4A and 4B is equal to "0", the protection data which is subsequently read out from the protection data area 52 in the cache memory 42 is transferred to the FIFO 56 subsequently to the end of the data block.

Reading Operation from the Cache Area to the Host Side

In FIGS. 3A and 3B, in the case where the user data in the cache area 54 in which it has been stored in the format such that the protection data was added after the data block read out from the array disk unit 20-1 is read out and transferred from the host interface control unit 36 to the host, the protection data is formed by the protection data control unit 62 from the data block read out from the cache area 54 when it passes through the cache control unit 40. The formed protection data is compared with the protection data read out from the cache area 54. When the validity is detected, only the data block is transferred to the host interface control unit 36 via the internal bus 55.

As mentioned above, according to the invention, when it is detected that the transfer of the data block of the user data from the upper apparatus side such as a host or the like was interrupted, the circuit state of the circuit which forms the protection data of the data block is temporarily stored. When the transfer destination of the data block is detected, the state of the circuit which forms the protection data is returned to the state upon interruption of the data transfer. Therefore, the transfer of the data block to the cache memory and the formation of the protection data can be executed in parallel. Since the transfer of the data block to the cache memory and the formation of the protection data can be executed in parallel, the interface speed between the cache control unit and the cache memory can be suppressed. Further, since the protection data is formed on the basis of the data block, there is no need to again read out the data from the buffer memory. The delay of the status report to the upper apparatus side can be avoided. The access performance for the writing request from the upper apparatus can be improved. Although the above embodiment has been mentioned with respect to the case where the RAID controllers 18-1 to 18-3 are used as disk control apparatuses and the array disk units 20-1 to 20-3 are used as device units, the invention can be applied as it is to the case where a plurality of ordinary magnetic disk units are provided without using the array construction as an example.

Although the case where the protection data control unit 62 of the cache control unit 40 is constructed by the hardware has been shown as an example, it can be realized by software as necessary or can be also realized by a DSP or the like.

Although the above embodiment has been described with respect to the case of the fabric topology such that the transfer interruption occurs between the apparatus and the host due to the path switching or the like during the data transfer as an example, the invention can be applied as it is to the case where the apparatus has a proper path change-over switch in which an interruption due to the path switching or the like occurs during the data transfer from the host.

Further, the present invention includes many proper modifications without losing the objects and advantages of the invention and is not limited by the numerical values shown in the embodiment.

What is claimed is:

1. A device control apparatus comprising:
   a host interface control unit controlling a communication with an upper apparatus;
   a cache memory in which user data and a management table have been stored;
   a cache control unit controlling said cache memory; and
   a main control unit controlling each of said control units by executing a control program stored in a main memory,
      wherein said cache control unit has a protection data control unit controlling such that in a writing operation to write the user data from the upper apparatus into said cache memory, protection data is formed in said user data and written into said cache memory, when an interruption of a transfer of said user data is detected, a forming state of the protection data upon interruption is stored in said cache memory, when a transfer restart of said user data is detected, the forming state is returned to the forming state of the protection data upon interruption stored in said cache memory, and the formation of the protection data is restarted and
      wherein said protection data control unit compares an OP code at the start of transfer which is set by the control program of said main control unit with an OP code during the transfer, detects a transfer interruption when a change in OP code is confirmed, compares an OP code upon interruption with an OP code during the interruption after the transfer interruption, and detects a transfer restart when a change in OP code is confirmed.

2. An apparatus according to claim 1, wherein when the transfer is interrupted in a boundary portion of a data block, said protection data control unit writes and stores said data block and the formed protection data into said cache memory, and when the transfer is restarted, said protection data control unit reads out a protection data formation initial value from said cache memory and forms protection data of a next data block.

3. An apparatus according to claim 1, wherein when the transfer is interrupted in the halfway of a data block, said protection data control unit writes and stores the protection data during the formation into said cache memory, and when the transfer is restarted, said protection data control unit reads out the protection data during the formation from said cache memory and returns the forming state to the state upon interruption, and thereafter, restarts the formation of the protection data corresponding to remaining data blocks.

4. An apparatus according to claim 1, wherein to manage protection data in a protection data area and data block in a buffer area, said cache memory has a protection data management table comprising:
   a start block address indicative of a start position of transfer data;
   a transfer block count indicative of the number of blocks to be transferred;
   a protection data head storage destination address to store the formed protection data;
   an OP code which is set in accordance with a data transfer state such as transfer, interruption, restart, or the like; and
   a seed to give a protection data formation initial value, and said protection data control unit repeats processes such that
      at the start of the transfer, the protection data head storage destination address in said table is set, into address data of a cache access destination, the seed in said table is set into a seed register, and further, the transfer block count in said table is set into a transfer count,
      at every transfer end of the data block, said data block and protection data are stored into said cache memory, thereafter, said address data and transfer count are increased, and the seed in said table is set into the seed register.

5. An apparatus according to claim 1, wherein to manage the protection data during the formation, said cache memory has an intermediate protection data management table comprising:
   a block address indicative of a start position of transfer data;
   an intermediate protection data storing address in the cache memory to temporarily store intermediate protection data during the formation;
   an OP code which is set in accordance with a data transfer state such as transfer, interruption, restart, or the like;
   a next seed to copy a seed which is being used;
   a transferred count indicative of the number of remaining bytes of a data block; and
   an executed block count indicative of the number of remaining blocks to be transferred, and said protection data control unit controls in a manner such that
      when the transfer is interrupted at a block boundary of the data block, address data to access a cache protection data area is copied into the intermediate protection data storing address in said table, an OP code set by the control program of said main control unit is copied to the OP code in said table, a seed register is copied into the next seed in said table, a transfer count is copied into the transferred count in said table, and further, a block count register is copied into said executed block count, and
      in the case where said interrupted transfer is restarted, the intermediate protection data storing address in said table is set into the address data to access the cache protection data area, the next seed in said table is set into the seed register, the transferred count in said table is set into the transfer count, and the executed block count in said table is set into the block count register.

6. An apparatus according to claim 5, wherein said protection data control unit controls such that
   in the case where the transfer is interrupted in the halfway of the data block, the address data to access the cache protection data area is copied into the intermediate protection data storing address in said table without increasing and the intermediate protection data during the formation is written into the protection data area in said cache memory, and
   in the case where the interrupted transfer is restarted, the intermediate protection data is read out from said cache protection data area and set into an intermediate seed register and, thereafter, the formation of the intermediate protection data is restarted.

7. An apparatus according to claim 1, wherein the inside of said cache memory is divisionally constructed by:
a cache management table area to store cache management information;
a buffer area to temporarily store the user data transferred from the upper apparatus via an internal bus;
a protection data area to store the protection data of the user data stored in said buffer area; and
a cache area to store the data transferred from said device via the internal bus.

8. An apparatus according to claim 1, wherein said protection data control unit forms the protection data from said data block by using a seed value in a seed register which is set by the control program of said main control unit as an initial value.

9. An apparatus according to claim 1, wherein said protection data control unit has a selector for switching a storage destination address of the user data and a storage destination address of the formed protection data when the user data is stored into a buffer area in said cache memory.

10. An apparatus according to claim 1, wherein in a reading operation to read out the data block from said cache memory and transfer it to the upper apparatus, while the protection data is formed from the data block read out from said cache memory, said protection data control unit simultaneously compares said formed protection data with the protection data read out from said cache memory and transfers said formed protection data to the upper apparatus when it is legal.

11. An apparatus according to claim 1, wherein when the user data read out from the device by a device interface control unit is written into said cache memory, while the protection data is formed from the data block of the read-out user data, said protection data control unit compares said formed protection data with the read-out data added to said read-out data block and finishes the writing operation as being normal when it is legal.

12. An apparatus according to claim 1, wherein said device is an array disk unit constructed by a plurality of magnetic disk units.

13. An apparatus according to claim 1, wherein a fabric which functions as a path change-over switch using a fiber channel interface is provided between said apparatus and said upper apparatus.

14. A device control method of controlling input/output between an upper apparatus and a device unit through a cache memory, comprising the steps of:
in a writing operation to write user data from said upper apparatus into said cache memory, forming protection data on a data block unit basis of said user data and writing it into said cache memory;
when an interruption of a transfer of said data block is detected, storing a forming state of the protection data upon interruption into said cache memory;
when a transfer restart of said data block is detected, returning a forming state to the forming state of the protection data upon interruption stored in said cache memory and restarting the formation of the protection data; and
wherein an OP code at the start of transfer which is set by a control program is compared with an OP code during the transfer, and when it is confirmed that there is a difference between them, the transfer interruption is detected, and after the transfer interruption, an OP code upon interruption is compared with an OP code during the interruption, and the transfer restart is detected when it is confirmed that there is a difference between them.

15. A method according to claim 14, wherein when the transfer is interrupted in a boundary portion of the data block, said data block and the formed protection data are written and stored in said cache memory, and when the transfer is restarted, a protection data formation initial value is read out from said cache memory, and protection data of a next data block is formed.

16. A method according to claim 14, wherein when the transfer is interrupted in the halfway of the data block, the protection data during the formation is written and stored into said cache memory, and when the transfer is restarted, the protection data during the formation is read out from said cache memory, the forming state is returned to the state upon interruption, and thereafter, the formation of the protection data corresponding to remaining data blocks is restarted.

17. A method according to claim 14, wherein to manage protection data in a protection data area and data block in a buffer area, said cache memory prepares a protection data management table comprising:
a start block address indicative of a start position of transfer data;
a transfer block count indicative of the number of blocks to be transferred;
a protection data head storage destination address to store the formed protection data;
an OP code which is set in accordance with a data transfer state such as transfer, interruption, restart, or the like; and
a seed to give a protection data formation initial value,
and wherein there are repeated processes such that
at the start of the transfer, the protection data head storage destination address in said table is set into address data of a cache access destination, the seed in said table is set into a seed register, and further, the transfer block count in said table is set into a transfer count,
at every transfer end of a data block, said data block and protection data are stored into said cache memory, thereafter, said address data and transfer count are increased, and the seed in said table is set into the seed register.

18. A method according to claim 14, wherein to manage the protection data during the formation, said cache memory prepares an intermediate protection data management table comprising:
a block address indicative of a start position of transfer data;
an intermediate protection data storing address in the cache memory to temporarily store intermediate protection data during the formation;
an OP code which is set in accordance with a data transfer state such as transfer, interruption, restart, or the like;
a next seed to copy a seed which is being used;
a transferred count indicative of the number of remaining bytes of the data block; and
an executed block count indicative of the number of remaining blocks to be transferred,
and wherein when the transfer is interrupted at a block boundary of the data block, address data to access a cache protection data area is copied into the intermediate protection data storing address in said table, an OP code set by said control program is copied to the OP code in said table, a seed register is copied into a next seed in said table, a transfer count is copied into the transferred count in said table, and further, a block count register is copied into said executed block count, and in the case where said interrupted transfer is restarted, the intermediate protection data storing address in said table is set into the address data to access the cache protection data area, the next seed in said table is set into the seed register, the transferred count in said table is set into the transfer count, and the executed block count in said table is set into the block count register.

19. A method according to claim 18, wherein in the case where the transfer is interrupted in the halfway of the data block, the address data to access a cache protection data area is copied into the intermediate protection data storing address without increasing and intermediate protection data during the formation is written into the protection data area in said cache memory, and in the case where the interrupted transfer is restarted, the intermediate protection data is read out from said cache protection data area and set into an intermediate seed register and, thereafter, the formation of the intermediate protection data is restarted.

\* \* \* \* \*